(12) United States Patent
Shirota et al.

(10) Patent No.: US 9,304,578 B2
(45) Date of Patent: Apr. 5, 2016

(54) CONTROL DEVICE, DATA PROCESSING DEVICE, CONTROLLER, METHOD OF CONTROLLING THEREOF AND COMPUTER-READABLE MEDIUM

(71) Applicant: KABUSHIKI KAISHA TOSHIBA, Minato-ku, Tokyo (JP)

(72) Inventors: Yusuke Shirota, Kanagawa-ken (JP); Tatsunori Kanai, Kanagawa-ken (JP); Tetsuro Kimura, Tokyo (JP); Haruhiko Toyama, Kanagawa-ken (JP); Koichi Fujisaki, Kanagawa-ken (JP); Junichi Segawa, Kanagawa-ken (JP); Masaya Tarui, Kanagawa-ken (JP); Satoshi Shirai, Kanagawa-ken (JP); Hiroyoshi Haruki, Kanagawa-ken (JP); Akihiro Shibata, Tokyo (JP)

(73) Assignee: KABUSHIKI KAISHA TOSHIBA, Tokyo (JP)

(*) Notice: Subject to any disclaimer, the term of this patent is extended or adjusted under 35 U.S.C. 154(b) by 281 days.

(21) Appl. No.: 14/018,652

(22) Filed: Sep. 5, 2013

(65) Prior Publication Data

US 2014/0075227 A1 Mar. 13, 2014

(30) Foreign Application Priority Data

Sep. 7, 2012 (JP) ................................ 2012-197013

(51) Int. Cl.
*G06F 1/32* (2006.01)

(52) U.S. Cl.
CPC .............. *G06F 1/3275* (2013.01); *G06F 1/324* (2013.01); *G06F 1/3228* (2013.01); *G06F 1/3265* (2013.01); *G06F 1/3287* (2013.01); *Y02B 60/1217* (2013.01); *Y02B 60/32* (2013.01)

(58) Field of Classification Search
CPC ... G06F 1/3275; G06F 1/3287; G06F 1/3228; G06F 1/3265; G06F 1/324
See application file for complete search history.

(56) References Cited

U.S. PATENT DOCUMENTS

| 5,864,336 A * | 1/1999 | Yano .............................. 713/321 |
| 7,266,641 B2 | 9/2007 | Kamei et al. |

(Continued)

FOREIGN PATENT DOCUMENTS

| JP | 2002-230970 | 8/2002 |
| JP | 2004-178016 | 6/2004 |

OTHER PUBLICATIONS

Japanese Office Action for Japanese Patent Application No. 2012-197013 mailed Aug. 5, 2014.

(Continued)

*Primary Examiner* — Stefan Stoynov
(74) *Attorney, Agent, or Firm* — Amin, Turocy & Watson LLP; Gregory Turocy

(57) ABSTRACT

A control device according to embodiments comprises a data-copying unit, a data-processing instructing unit, and a power-control unit. The data-copying unit copies data in a first memory to a second memory of which power consumption is less than power consumption of the first memory. The data is to be processed at a first data processing unit. The data-processing instructing unit instructs the first data processing unit to process the data copied to the second memory. The power-control unit switches power for the first memory from a first power to a second power while the first data processing unit is processing the data copied to the second memory. The first power is power supplied to the first memory at a time when the data is copied from the first memory to the second memory. The second power is lower than the first power.

13 Claims, 40 Drawing Sheets

(56) References Cited

U.S. PATENT DOCUMENTS

| | | | | |
|---|---|---|---|---|
| 8,305,598 B2 * | 11/2012 | Iwashima | ............... | 358/1.14 |
| 8,607,084 B2 * | 12/2013 | Huang et al. | ............... | 713/320 |
| 8,682,460 B2 * | 3/2014 | Lindahl | ............... | 700/94 |
| 8,810,589 B1 * | 8/2014 | Khoury et al. | ............... | 345/537 |
| 2004/0103253 A1 | 5/2004 | Kamei et al. | | |
| 2012/0246356 A1 | 9/2012 | Shibata et al. | | |
| 2012/0246390 A1 | 9/2012 | Kanai et al. | | |
| 2012/0246501 A1 | 9/2012 | Haruki et al. | | |
| 2012/0246503 A1 | 9/2012 | Fujisaki et al. | | |
| 2013/0073812 A1 | 3/2013 | Kanai et al. | | |
| 2013/0080812 A1 | 3/2013 | Shirota et al. | | |
| 2013/0080813 A1 | 3/2013 | Tarui et al. | | |
| 2013/0091372 A1 | 4/2013 | Kimura et al. | | |
| 2013/0191670 A1 | 7/2013 | Haruki et al. | | |
| 2013/0219203 A1 | 8/2013 | Fujisaki et al. | | |
| 2013/0254773 A1 | 9/2013 | Kimura et al. | | |
| 2013/0268781 A1 | 10/2013 | Kanai et al. | | |
| 2014/0013138 A1 | 1/2014 | Kanai et al. | | |
| 2014/0013140 A1 | 1/2014 | Segawa et al. | | |
| 2014/0075227 A1 | 3/2014 | Shirota et al. | | |
| 2014/0077604 A1 | 3/2014 | Shibata et al. | | |
| 2014/0089715 A1 | 3/2014 | Kimura et al. | | |
| 2014/0139500 A1 | 5/2014 | Kimura et al. | | |

OTHER PUBLICATIONS

Office Action of Notice of Rejection for Japanese Patent Application No. 2012-197013 Dated Mar. 24, 2015, 3 pages.

Freescale Semiconductor, Inc., i.MX50 Multimedia Applications Processor Reference Manual, Rev. 1, Oct. 2011.

Chinese Office Action for Chinese Patent Application No. 201310398746.8 mailed on Sep. 29, 2015.

Taiwanese Office Action for Taiwanese Patent Application No. 102130909 mailed on Jul. 9, 2015.

* cited by examiner

CONTROL DEVICE, DATA PROCESSING DEVICE, CONTROLLER, METHOD OF CONTROLLING THEREOF AND COMPUTER-READABLE MEDIUM

CROSS-REFERENCE TO RELATED APPLICATION(S)

This application is based upon and claims the benefit of priority from the Japanese Patent Application No. 2012-197013, filed on Sep. 7, 2012; the entire contents of which are incorporated herein by reference.

FIELD

Embodiments described herein relate generally to a control device, a data processing device, a controller, a method of controlling thereof, and a computer-readable medium.

BACKGROUND

Traditionally, in a compact data (information) processing device and a portable data processing device such as a slate computer, a tablet computer, and so forth, an efficiency of power use is a key technical issue. By using a memory display, e.g. an electronic paper, that consumes power only at a time of updating, as a display of such data processing device, it is possible to suppress standby power consumption such as power consumption at a time when a user browses.

As a memory equipped with such data processing device, it is possible to use a DRAM (dynamic random access memory), or the like. The DRAM has power-saving modes such as a self-refresh mode, and by using such DRAM as the memory of the data processing device, it is possible to achieve power saving by switching to such power-saving modes at a time of idling when there is no access for a certain period.

Furthermore, as a SoC (system-on-chip) for the electronic paper, i.MX50 Multimedia Applications Processor, or the like, is known.

However, in a conventional art, during an active operation, a memory display such as the electronic paper requires continuous access to a memory storing data for updating while the memory display is conducting an updating process. Therefore, it is impossible to utilize the power-saving mode of the memory and to turn off the power of the memory in such display. Especially, because a drawing time in the electronic paper is longer than that of a LCD (liquid crystal display), or the like, inability of reduction of power consumption in the memory during the drawing time heavily influences the power consumption in the whole system.

DETAILED DESCRIPTION

Exemplary embodiments of a data processing device, a controller, a method of controlling thereof, and a computer-readable medium will be explained below in detail with reference to the accompanying drawings.

First Embodiment

Figure 1:
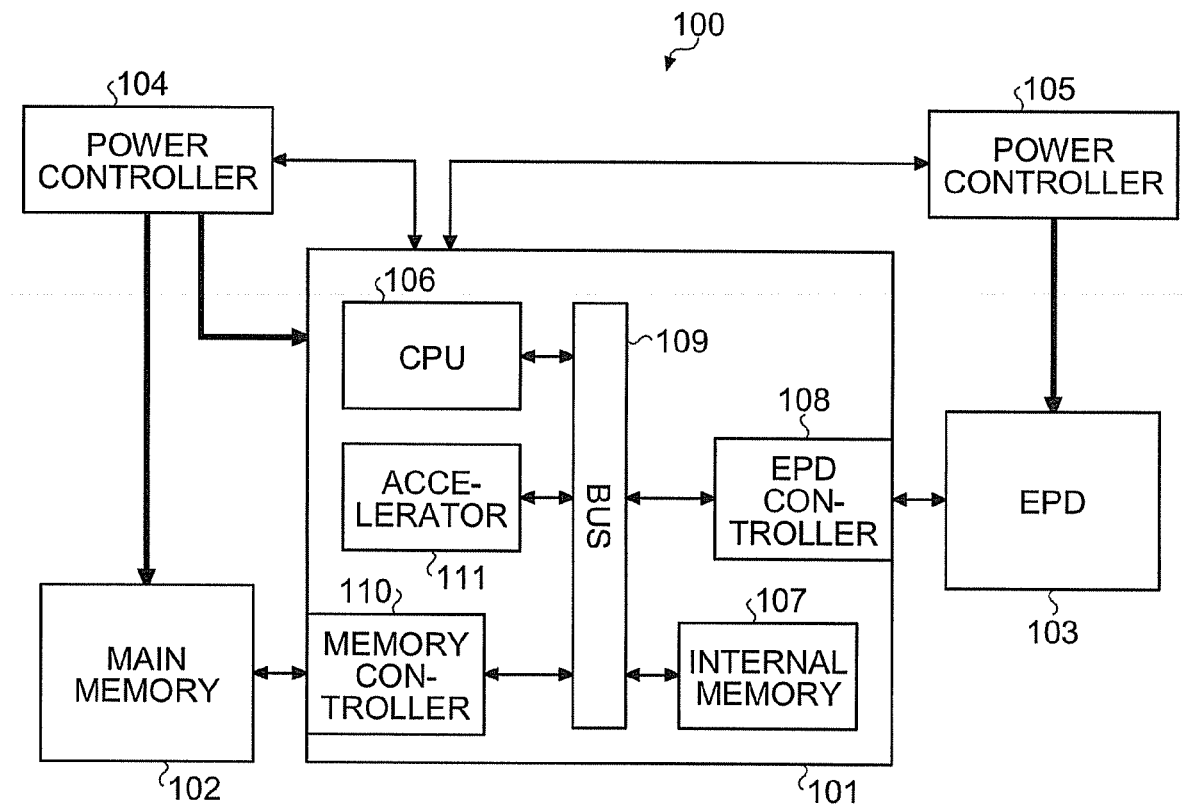
FIG. 1 is a schematic block diagram showing a data processing device according to a first embodiment.

FIG. 1 is a block diagram showing an example of an outline structure of a data processing device according to a first embodiment. As shown in FIG. 1, the data processing device 100 has a SoC 101, a main memory 102, an EPD (electronic paper display) 103, and power control devices 104 and 105 such as a PMIC (power management IC).

The EPD 103 is a display with a memory capability. As a display with a memory capability, not limited to the EPD 103, various sorts of displays can be used. As a method of the electronic paper in the EPD 103, various kinds of methods such as an electrophoretic display, a quick response liquid powder display, a cholesteric liquid crystal display, or the like, can be applied.

The main memory 102 is a non-volatile memory such as an MRAM (magnetoresistive random access memory), or the like. On the main memory 102, data for updating (hereinafter to be referred to as update-data), which is to be displayed on the EPD 103, is stored. The update-data is data mainly of a display-targeted image, and so forth. However, the update-data is not limited to such data while the update-data can include a waveform required for updating the EPD 103, or the like.

The SoC 101 has a CPU 106, a memory controller 110, an internal memory 107, an EPD controller 108, and an accelerator 111. The CPU 106 operates an EPD control device (scheduler) for scheduling data input of update-data to the EPD 103. The EPD controller 108 can have a function for executing updating processes in parallel. In a parallel execution of updating processes, one or more updating processes may be started at the same time or in very close timings, or one updating process may be started while another updating process is being executed. The accelerator 111 is used for preprocess for preparing update-data, for instance. The preprocess may include a conversion process for converting color data to grayscale data, a black and white reversal process, a selection process for selecting an optimal waveform, a data rotation process, and so forth, for the EPD. Furthermore, the preprocess can include a temperature detection process for detecting ambient temperature, etc., for selecting a waveform, a rendering process, a data writing to a frame buffer, or the like, but not limited to such processes. The CPU 106, the memory controller 110, the internal memory 107, the EPD controller 108 and the accelerator 111 are connected to each other via a bus 109, for instance.

A power consumption at the main memory (first memory) 102 is greater than a power consumption at the internal memory (second memory) 107. The power consumption may be average power, power required for processing the same data, or the like. In this explanation, data processing means a data readout process, a data writing process, and so forth. A size of the main memory 102 is greater than a size of the internal memory 107. Generally, the greater the memory is the greater the power consumption becomes.

Between the two power control devices, the power control device 104 feeds power to the main memory 102 and the SoC 101, and the power control device 105 feeds power to the EPD 103. These power control devices 104 and 105 can be controlled using control signal outputted from the CPU 106. However, such structure is not definite while it is also possible to have a structure in that a single power control device feeds power to the main memory 102, the SoC 101 and the EPD 103. This is the same for the following embodiments.

The internal memory 107 is an on-chip memory with small capacity and low power consumption. Therefore, costs such as power consumption, access time, and so forth, for memory access to the internal memory 107 are small. The internal memory 107 with low power consumption has two buffers #0 and #1, for instance. The number of the buffers is not limited to two while one or two or more can be applied.

Figure 2:
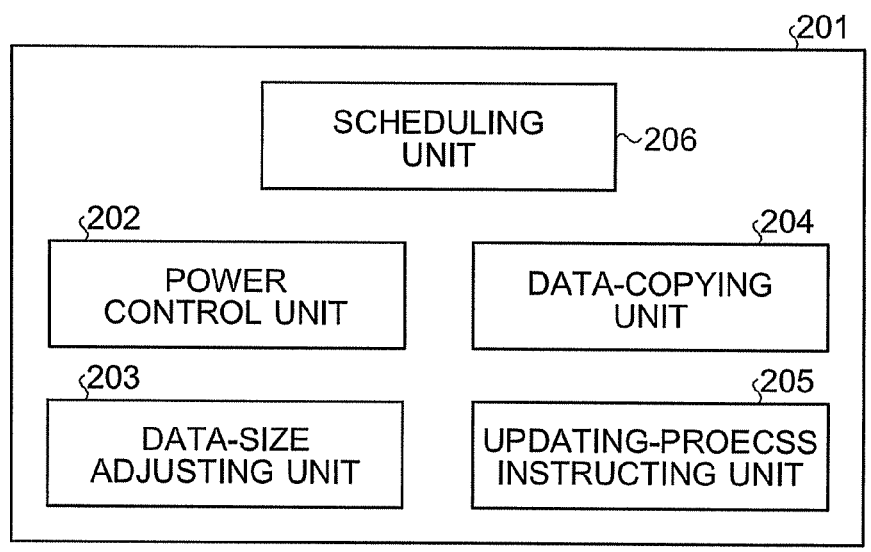
FIG. 2 is a schematic block diagram showing an EPD control device according to the first embodiment.

FIG. 2 is a block diagram showing an example of an outline structure of an EPD control device (scheduler) 201 according to the first embodiment. The EPD control device (scheduler) 201 may be a device driver of an operating system (hereinafter to be referred to as OS) operating on the CPU 106.

As shown in FIG. 2, the EPD control device (scheduler) 201 has a scheduling unit 206, a power control unit 202, a data-size adjusting unit 203, a data-copying unit 204, and an updating-process instructing unit 205. When the scheduling unit 206 is instructed to update the whole screen of the EPD 103 from an application, a middleware, an OS, or the like, operating on the data processing device 100, the scheduling unit 206 makes the power control unit 202, the data-size adjusting unit 203, the data-copying unit 204 and the updating-process instructing unit 205 operate in cooperation with one another. According to such operation, the scheduling unit 206 schedules so that update-data on the main memory 102 is divided in pieces, the divided data are sequentially copied to two buffers #0 and #1 on the internal memory 107 alternately, and the EPD controller 108 executes the updating processes directed to the EPD 103 from the buffer #0 or #1. While updating the EPD 103, the power for the internal memory 107 having the buffers #0 and #1 should be powered on. Costs such as power consumption, access time, or the like, required for copying to the internal memory 107 and for reading out from the internal memory 107 can be kept small. On the other hand, during this period, it is possible to power off the main memory 102 being a non-volatile memory. Therefore, it is possible to reduce the total power consumption rather than a case where the EPD 103 is directly updated from the main memory 102.

Figure 3:
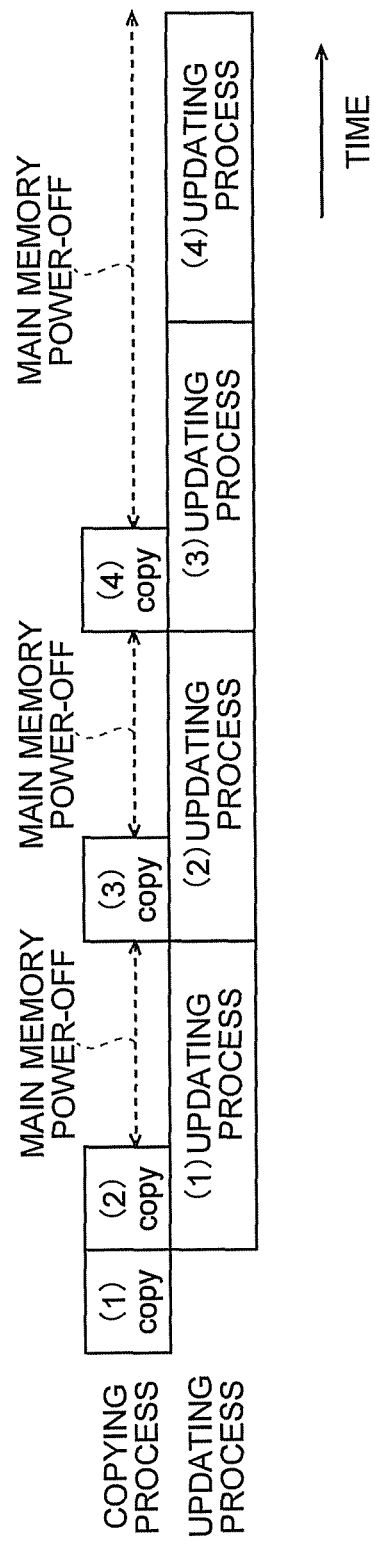
FIG. 3 is a timing chart showing an example of operation timing according to the first embodiment.

FIG. 3 is a timing chart showing an example of operation timing scheduled by the EPD control device (scheduler) 201 according to the first embodiment. FIG. 3 shows an example of a case where update-data is divided in four. Therefore, in the example shown in FIG. 3, copying processes are executed four times, and updating processes are executed four times.

As shown in FIG. 3, a period between a certain copying process and the next copying process is an idle time in which there is no memory access to the main memory 102. Therefore, by using a non-volatile memory with which unprocessed divided data will not be erased even if the main memory 102 is powered off, it is possible to power off the main memory 102 during the idle time. As described above, by copying data to the memory with low power consumption and executing the process of updating from the memory, it is possible to reduce the power consumption rather than in the case where updating process is executed directly from a memory with high power consumption. Furthermore, as shown in FIG. 3, by executing the copying process and the updating process in parallel, it is possible to hide a delay caused by the copying process behind the updating process.

Figure 4:
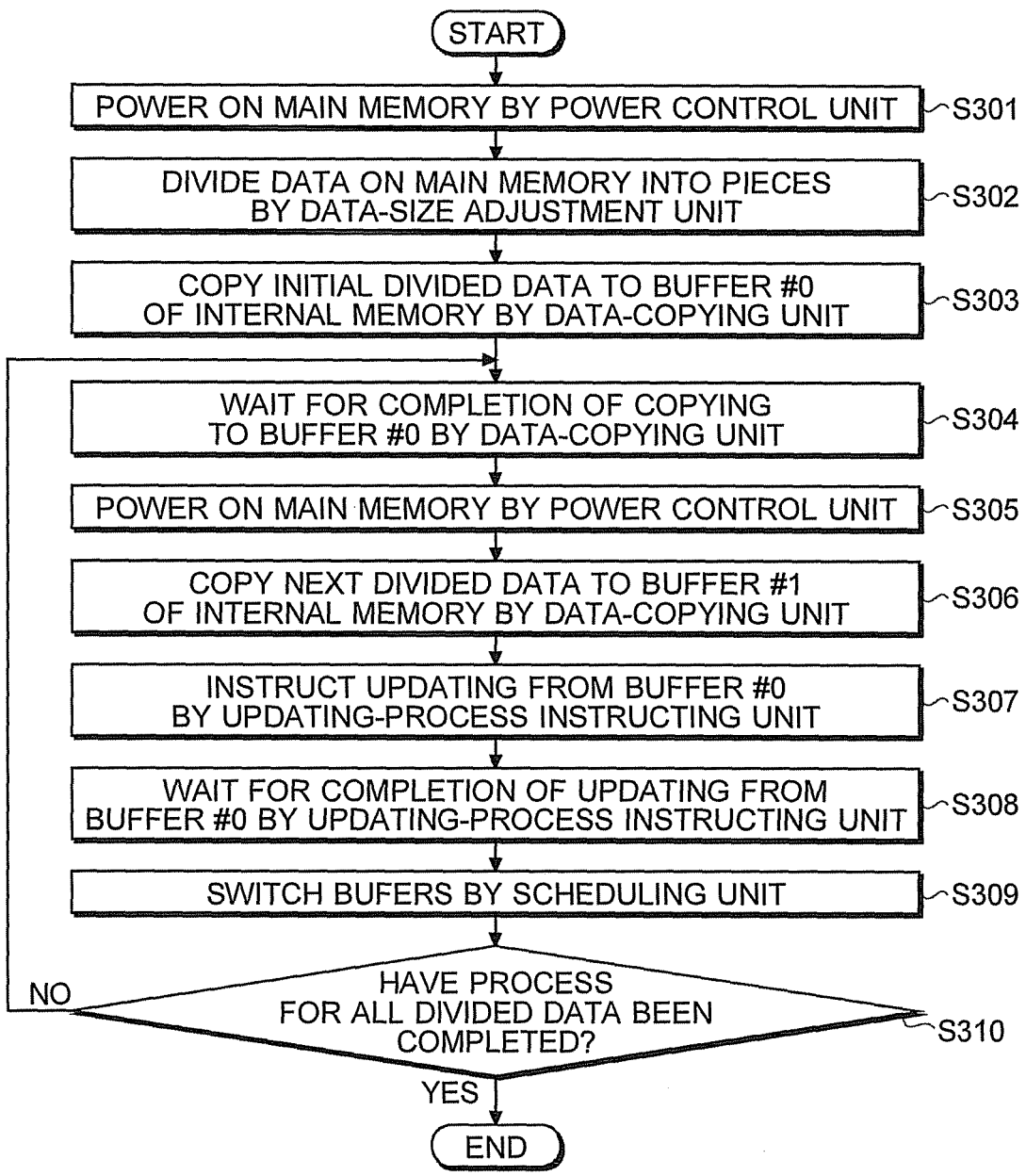
FIG. 4 is an illustration showing an example of a process flow of the EPD control device according to the first embodiment.
Figure 5:
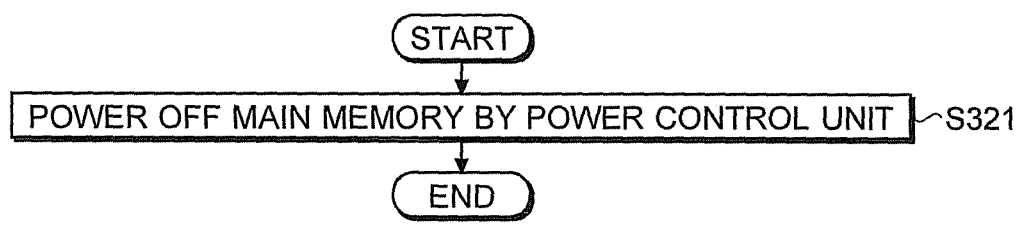
FIG. 5 is an illustration showing an example of another process flow of the EPD control device according to the first embodiment.

Next, a specific example of a process flow of the EPD control device (scheduler) 201 for powering off the main memory 102 during the updating process of the EPD 103 is shown in FIGS. 4 and 5. However, because the process flow shown in FIGS. 4 and 5 is merely one example for achieving the operation timing as shown in FIG. 3, the embodiment is not limited to such flow. This is the same for the following embodiments.

The process flow shown in FIG. 4 starts as an application, a middleware or an OS requests the scheduling unit 206 of the EPD control device (scheduler) 201 to update the EPD 103 once using the update-data on the main memory 102.

In the process flow shown in FIG. 4, firstly, when the main memory 102 is not powered on, in order to prepare for a possible follow-on copying process, the power control unit 202 powers on the main memory 102 using the power control device 104 (step S301).

Next, the data-size adjusting unit 203 divides the update-data on the main memory 102 into a plurality of divided data (step S302). The update-data may be data such as image data to be displayed on the EPD 103.

Next, the data-copying unit 204 executes a copying process for copying the initial divided data among the plurality of the divided data to the buffer #0 on the internal memory 107 (step S303). After that, the data-copying unit 204 waits for the completion of the process of copying to the buffer #0 (step S304).

After completing the process of copying to the buffer #0, next, when the main memory 102 is not powered on, the power control unit 202 powers on the main memory 102 (step S305).

Then, when there is still the next divided data for which copying process has not been finished, the data-copying unit 204 copies the next divided data to the buffer #1 (step S306). Furthermore, the updating-process instructing unit 205, without waiting for completion of the process of copying the next divided data to the buffer #1, instructs the EPD controller 108 to execute a process of updating from the buffer #0 for which a process of copying to the EPD 103 has been completed (step S307), and then waits the completion of the updating process (step S308).

After completing the process of updating from the buffer #0 to the EPD 103, the scheduling unit 206 switches the buffers (step S309). Thereby, in the follow-on processes, the buffer having been identified as the buffer #0 becomes a buffer #1 and the buffer having been identified as the buffer #1 becomes a buffer #0.

After that, the scheduling unit 206 confirms whether the updating processes for all the divided data are completed or not (step S310), and when the processes are confirmed as being completed (step S310; YES), the scheduling unit 206 finishes the operation. On the other hand, when the processes are confirmed as not being completed (step S310; NO), the scheduling unit 206 returns to step S304 and executes the processes for the next divided data.

As shown in FIG. 5, when the process of copying to the buffer finishes in the middle of the updating process of the EPD 103, the completion of the copying process is notified to the power control unit 202. In response to this, the power control unit 202 powers off the main memory 102 using the power control device 104 independently from the operation shown in FIG. 4 (step S321). Thereby, it is possible to power off the main memory 102 during the updating process.

In FIGS. 3 to 5, although the case where the update-data is divided at a time when the whole screen of the EPD 103 is instructed to be updated once when the update-data does not fall within a capacity of the internal memory 107 (or the buffer), for instance, is explained, it is also possible to employ the same processes in a case of partial-updating process in which a part of the screen of the EPD 103 is to be updated.

Furthermore, in a simple case where the update-data falls within the capacity of the internal memory 107 (or the buffer) and the instruction for updating a part of the screen is received once, there is no necessity for executing the dividing process by the data-size adjusting unit 203. In that case, it is only necessary that the initial copying process (1) and the initial updating process (1) in FIG. 3 are executed once in this order, and in the middle of the updating process, the main memory 102 is powered off. This is the same for the following embodiments.

In the example of the operation timing shown in FIG. 3, the case where the instruction for updating the whole screen of the EPD 103 once is executed in installments is explained. Also in a case where four independent small partial-updatings are instructed for four different areas on the screen of the EPD 103 sequentially or at short intervals, for instance, operation timing can be achieved by the same process flow described above. That is, because a difference between such two cases is that in one case, the screen of the EPD 103 is divided into four and four updating processes are executed and in the other case, the previously-divided four areas (i.e., there is no necessity for the dividing process) are updated, it is possible to apply the same process flow to both of the cases. Here, a small partial-updating is an updating process in that a size of the update-data falls within each buffer.

Figure 6:
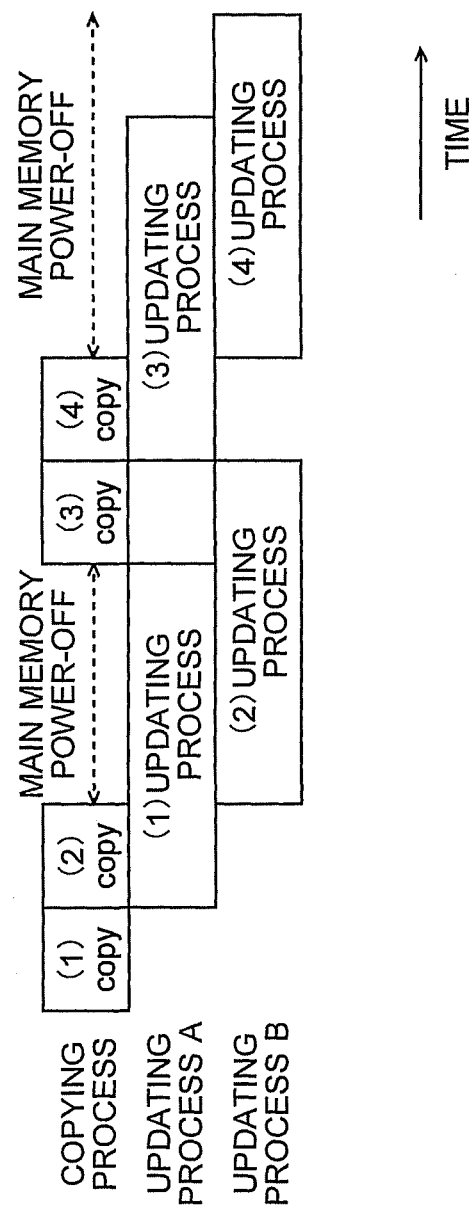
FIG. 6 is an illustration showing an example of another operation timing according to the first embodiment.

Moreover, in a case where a plurality of instructions for independent small updatings are received sequentially or at short intervals, when the EPD controller 108 has a function of executing a plurality of partial-updatings in parallel, the scheduling unit 206 can schedule an operation timing as the one shown in FIG. 6. As shown in FIG. 6, because updating processes can be executed in parallel, updating process A and updating process B overlap with each other. FIG. 6 shows an example of a case where instructions of independent updating processes for four different areas on a screen are received at short intervals and two partial-updating processes can be executed in parallel. In FIG. 6, initial two update-data are copied to buffers #0 and #1 on the internal memory at copy (1) and copy (2), and from the buffers #0 and #1, updating process (1) and updating process (2) are executed in parallel. After completing the updating process (1), because the buffer

0 on the internal memory 107 becomes free, copy (3) is executed, and from the buffer #0, updating process (3) is executed. After that, when the updating process (2) is completed, because the buffer #1 becomes free, copy (4) is executed, and from the buffer #1, updating process (4) is executed. In such case also, it is possible to power off the main memory 102 during an idle time in which no copying process is executed, and therefore, it is possible to reduce the power consumption by the same process flow described above. Hiding the delay caused by the copying process behind the updating process can be possible like in the examples described above.

Figure 7:
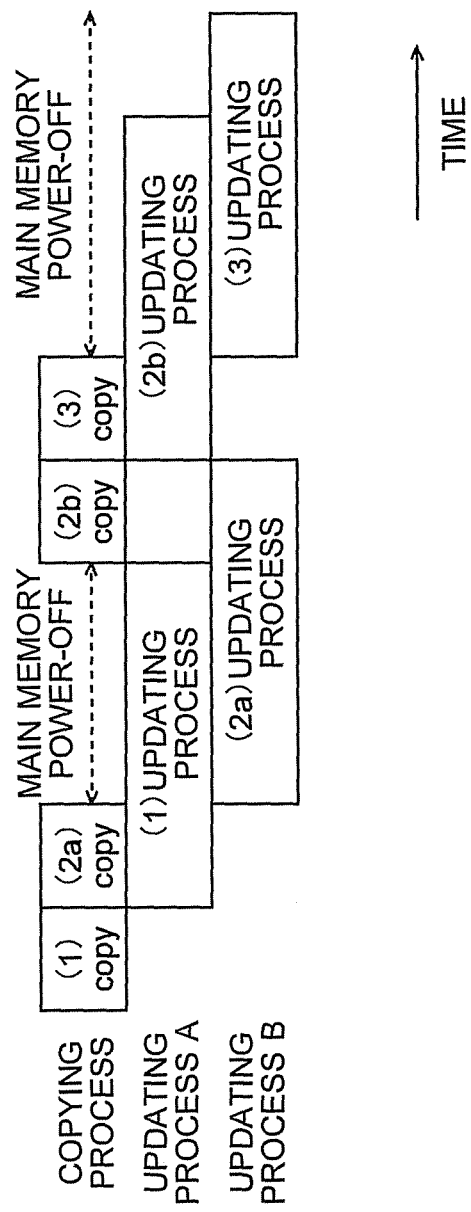
FIG. 7 is an illustration showing an example of still another operation timing according to the first embodiment.

Next, in FIG. 7, a case where an instruction of an updating process of which update-data does not fall within the capacity of the buffer is mixed in the instructions of independent updating processes as shown in FIG. 6 is shown. In FIG. 7, firstly an instruction of a small updating process is received, secondly an instruction of an updating process of which update-data does not fall within the capacity of the buffer is received, and thirdly an instruction of a small updating process is received again. As conditions, as with FIG. 6, two updating processes can be executed in parallel and the buffers #0 and #1 are provided. With a case where the size of the update-data for the second updating process falls within the capacities of two buffers added but not within the capacity of a single buffer, it is possible to deal with the case by using a dividing process. That is, firstly, copy (1) to the buffer #0 on the internal memory 107 is executed, and from the buffer #0, updating process (1) is executed. Next, the update-data of the second updating process is divided into two, copy (2a) of a front half of the divided update-data to the free buffer #1 is executed, and from the buffer #1, updating process (2a) is executed. After completing the updating process (1), because the buffer #0 becomes free, copy (2b) of a latter half of the divided update-data to the free buffer #0 is executed, and from the buffer #0, updating process (2b) is executed. In this way, it is possible to deal with an updating process with update-data that does not fall within the capacity of the buffer. During an idle time between the copying processes in FIG. 7, it is possible to power off the main memory 102, and therefore, it is possible to reduce the power consumption by the same process flow described above. Furthermore, when the update-data is very small, that is when the internal memory is large enough with respect to the update-data, by increasing buffers of which number is greater than the number of parallel executions the EPD controller 108 can execute, it is possible to execute necessary copies before hand.

Figure 8:
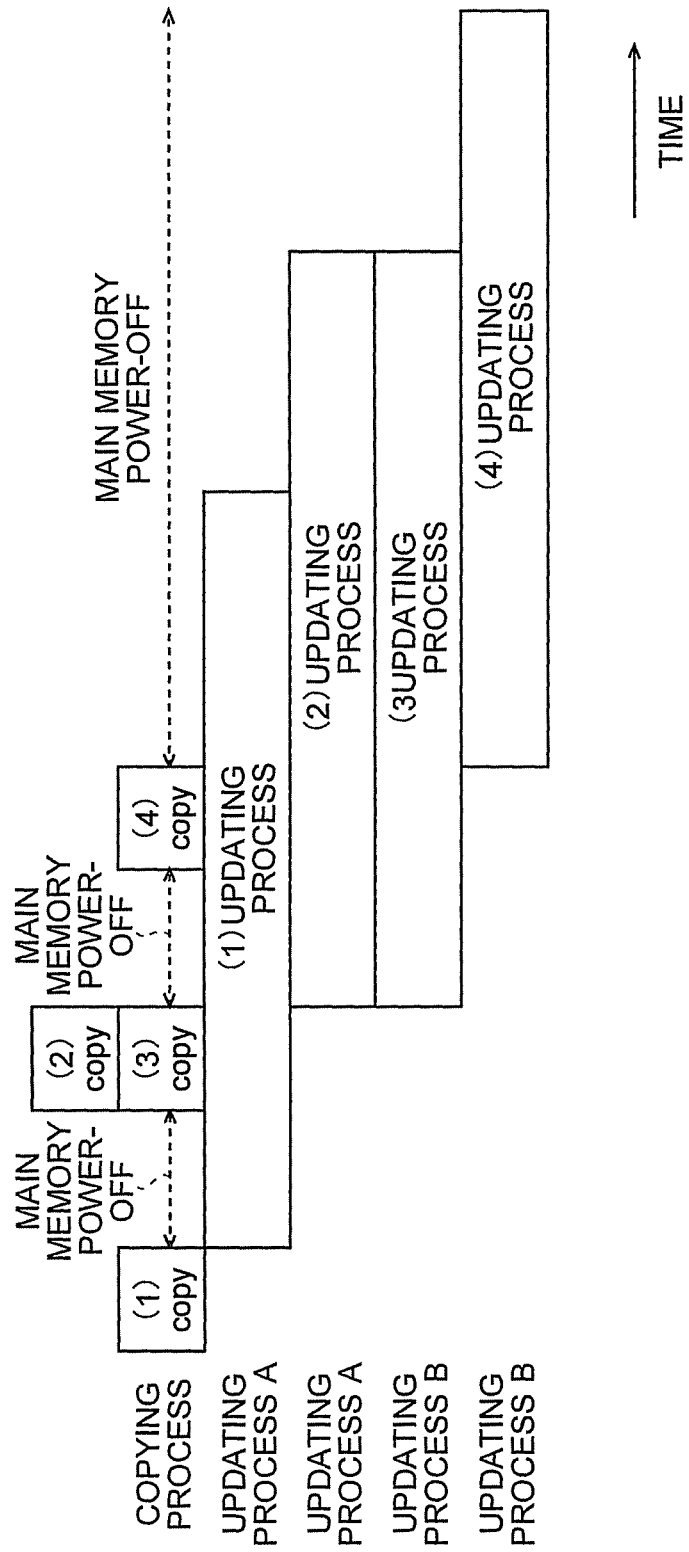
FIG. 8 is an illustration showing an example of still another operation timing according to the first embodiment.

Next, in FIG. 8, as in FIG. 6, a case where four independent updating processes are executed with respect to four different areas on the screen of the EPD 103 is shown. In FIG. 8, a first updating process is instructed, second and third updating processes are instructed at the same time a little behind the instruction of the first updating process, and a fourth updating process is instructed a little behind the instructions of the second and third updating processes. As long as the EPD controller 108 of FIG. 8 can execute four updating processes in parallel, it is possible to execute the updating processes A to D in parallel. In order to execute four updating processes in parallel, four buffers #0 to #3 are arranged in the internal memory 107, for instance. In FIG. 8, copy (1) is executed to the buffer #0 on the internal memory 107, and from the buffer #0, updating process (1) is executed. Copy (2) and copy (3) to the buffers #1 and #2 are executed, and from the buffers #1 and #2, updating process (2) and updating process (3) are started at the same time and executed in parallel to the updating process (1). Copy (4) is executed to the buffer #3 on the internal memory 107, and from the buffer #3, updating process (4) is executed. As shown in FIG. 8, during an idle time between the copying processes, it is possible to power off the main memory 102, and therefore, it is possible to reduce the power consumption by the same process flow described above. Furthermore, when the update-data is very small, that is, when the internal memory has enough rooms with respect to the update-data, by increasing buffers to the number of which is greater than the number of parallel executions the EPD controller 108 can execute (five or more in this case), it is possible to execute necessary copies before hand.

Such scheduling method with parallel execution of updating processes can be applied to the other following embodiments. It is not shown in the drawings, but because a preprocess etc. is necessary before the copying process, there is a necessity of powering on the main memory 102 during the preprocess.

Figure 9:
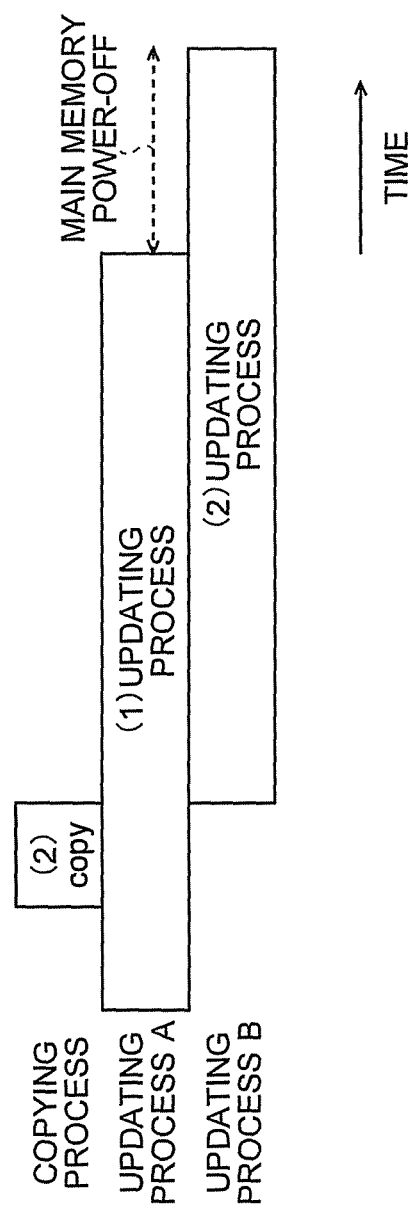
FIG. 9 is an illustration showing an example of still another operation timing according to the first embodiment.

Sizes of the partial-updating processes can differ from one another. As shown in FIG. 9, when a large partial-updating process is included, by employing a structure in that the large partial-updating process is executed directly from the main memory 102, and other small updating processes instructed a little behind the large partial-updating process are copied to the internal memory and executed therefrom, it is possible to power off the main memory 102 at a time when the large partial-updating process with a large updating area is finished. As a result, it is possible to reduce the power consumption. In FIG. 9, due to the updating process (1) being executed from the main memory 102, it is not possible to power off the main memory 102 during the updating process (1). On the other hand, because the copy (2) which is instructed or scheduled after the updating process (1) is executed to the internal memory 107 and the updating process (2) is executed therefrom, when the updating process (1) is finished early, it is possible to power off the main memory 102 while the updating process (2) is being executed.

An updating mode and a waveform of the EPD can be different. These are also the same for the following embodiments.

A waveform may be copied to the internal memory 107 together with data such as image data to be displayed each time or may be copied together with the initial data of divided data at a time when the initial data is copied. It is also possible that the waveform is previously copied to the internal memory 107 at a time of starting a series of updating processes or booting the system. Furthermore, it is also possible that the waveform is remained on the main memory 102 and the EPD controller 108 reads out the waveform from the main memory 102.

Moreover, it is possible that the whole waveform is copied or only a necessary part of the waveform is copied depending on a characteristic of data to be displayed. Moreover, a copying destination to of the waveform may be the buffer #0 or #1 on the internal memory 107 or may be an dedicated area for the waveform arranged in the internal memory 107. This is the same for the following embodiments.

In the first embodiment, although the structure in that the EPD controller 108 is integrated into the SoC 101 is explained as an example, the structure is not limited to such example while it is also possible to employ a structure in that the EPD controller 108 is arranged in the exterior of the SoC 101.

According to the first embodiment, by replacing a time consuming, power consuming memory access to a memory that stores update-data with a memory access with low power consumption, it is possible to create an idle time with no memory access to the memory requiring high power consumption while updating a memory display such as the electronic paper which requires a comparatively long time.

Thereby, during the idle time, because it is possible to power off a non-volatile memory such as an MRAM, it is possible to reduce the power consumption of the display.

Second Embodiment

Next, a control device, a data processing device, a controller, a method of controlling thereof, and a computer-readable medium according to a second embodiment will be described in detail with the accompanying drawings.

In the first embodiment, although a non-volatile memory such as an MRAM is used for the main memory 102 in the data processing device 100, in the second embodiment, a volatile memory such as a DRAM is used. Base configurations of a data processing device and an EPD control device (scheduler) 201 according to the second embodiment are the same as the configurations of the data processing device 100 and the EPD control device (scheduler) 201 shown in FIGS. 1 and 2, and therefore, redundant explanations thereof will be omitted by referring to them.

In a case where the volatile memory such as a DRAM is used for the main memory 102, when power supply to the main memory 102 is shut off, data in the main memory 102 will be erased. Therefore, in the second embodiment, in order to reduce the power consumption, during an idle time in which there is no memory access between the copying processes, a power-saving mode capable of suppressing power consumption while maintaining data, such as a self-refresh mode implemented in a memory, is executed.

Figure 10:
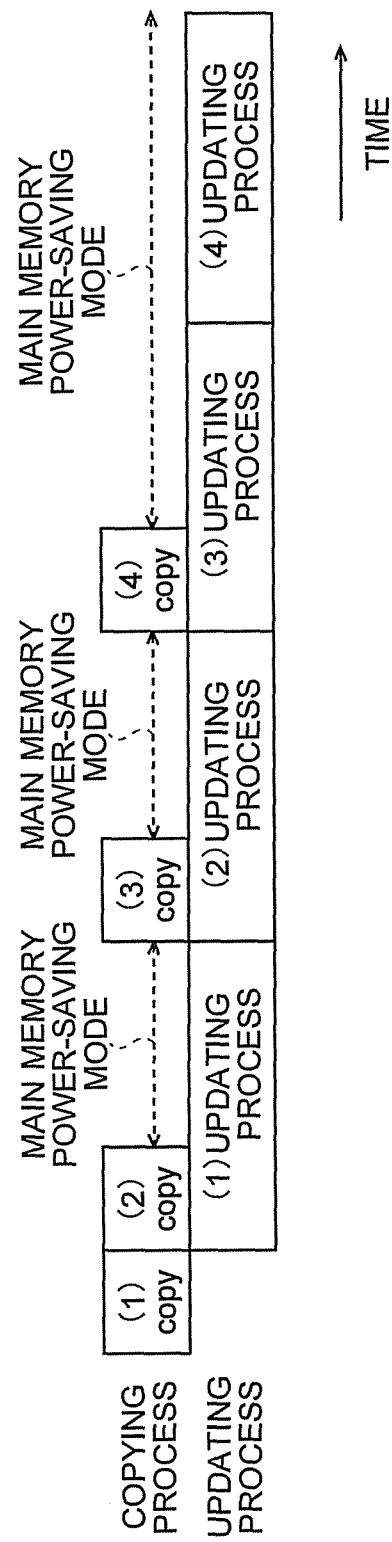
FIG. 10 is an illustration showing an example of operation timing according to a second embodiment.

FIG. 10 is a timing chart showing an example of operation timing scheduled by an EPD control device (scheduler) 201 according to the second embodiment. In FIG. 10, base operation timing can be the same as the operation timing shown in FIG. 3. However, between FIG. 10 and FIG. 3, what is different in structure is that with the case of FIG. 10 the main memory 102 such as a DRAM is set to a power-saving mode during the idle time between the copying processes.

Figure 11:
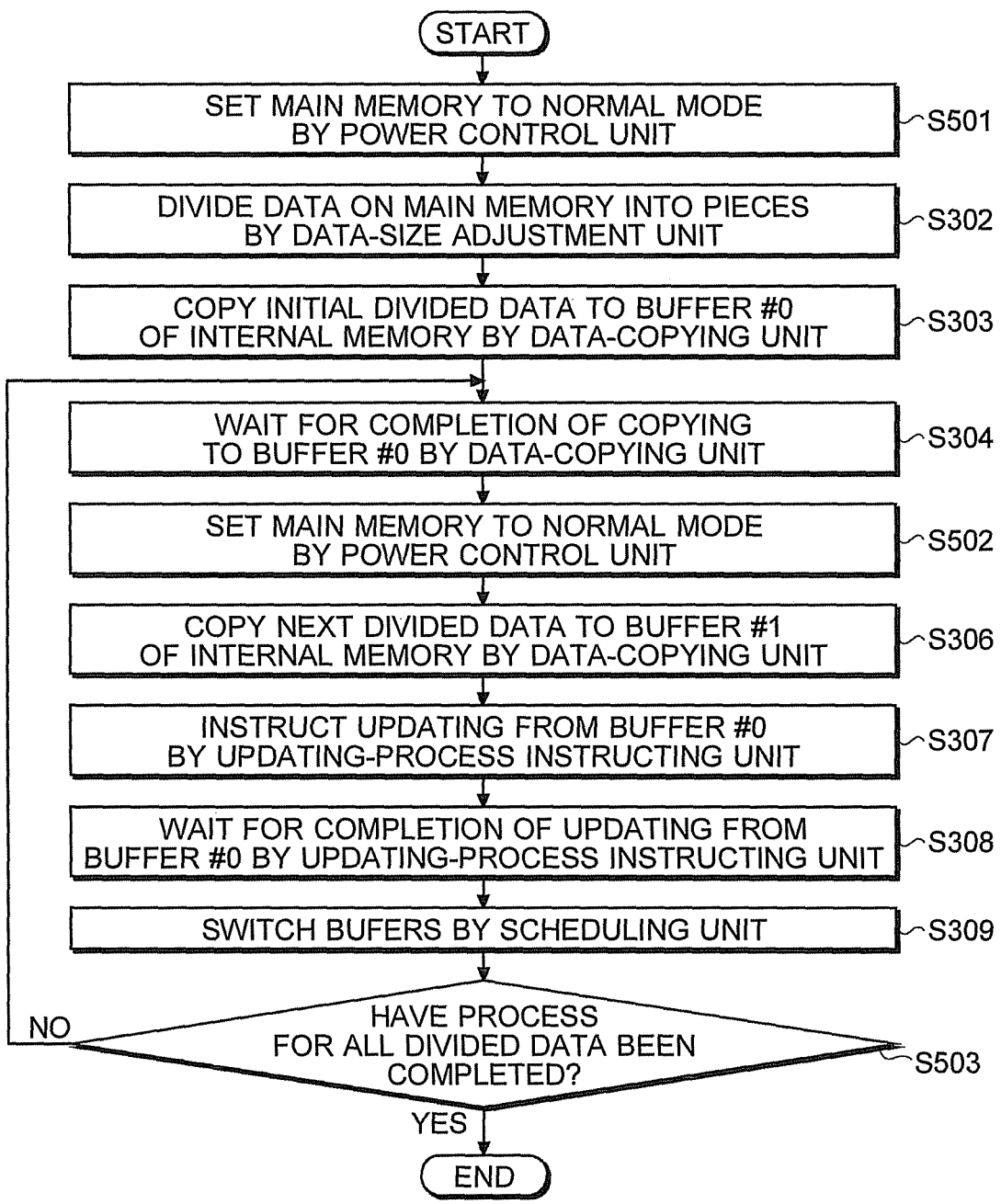
FIG. 11 is an illustration showing an example of a process flow of an EPD control device according to the second embodiment.
Figure 12:
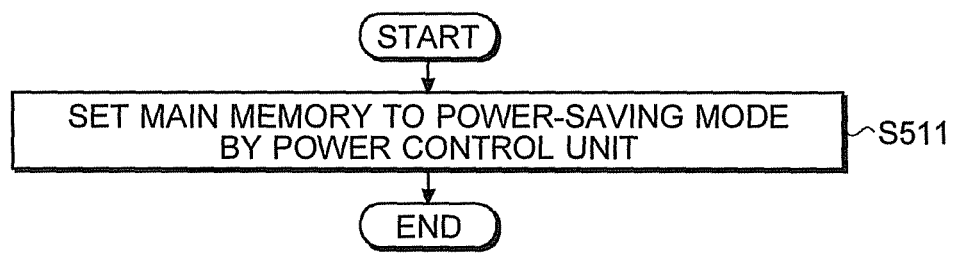
FIG. 12 is an illustration showing an example of another process flow of the EPD control device according to the second embodiment.

Next, a specific example of a process flow of the EPD control device (scheduler) 201 for setting the main memory 102 to a power-saving mode during the updating process of the EPD 103 is shown in FIGS. 11 and 12. In FIG. 11, for the same operations as in the operations shown in the FIG. 4, redundant explanations thereof will be omitted by referring to them.

As shown in FIG. 11, when an application, a middleware or an OS requests the scheduling unit 206 of the EPD control device (scheduler) 201 to update the EPD 103 once using the update-data on the main memory 102, for instance, firstly, if an operation mode of the main memory 102 is not set to a normal mode, in order to brace for a possible follow-on copying process, the power control unit 202 sets the operation mode of the main memory 102 to the normal mode using the memory controller 110 (step S501). Next, by executing the same operations as steps S302 to S304 in FIG. 4, the initial divided data is copied to the buffer #0. Here, the normal mode is an operation mode in that the main memory 102 operates normally with respect to a memory access. Power consumption with the normal mode is greater than that with the power-saving mode.

After completing the process of copying to the buffer #0, next, when the operation mode of the main memory 102 is not set to the normal mode, the power control unit 202 sets the operation mode of the main memory 102 as the normal mode by setting the memory controller 110 (step S502). Next, by executing the same operation as steps S306 to S309 in FIG. 4, after completing the updating process with the next divided data, the scheduling unit 206 switches the buffers.

After that, the scheduling unit 206 confirms whether the updating processes for all the divided data are completed or not (step S503), and when the processes are confirmed as being completed (step S503; YES), the scheduling unit 206 finishes the operation. On the other hand, then the processes are confirmed as not being completed (step S503; NO), the scheduling unit 206 returns to step S304 and executes the processes for the next divided data.

As shown in FIG. 12, when the process of copying to the buffer finishes in the middle of the updating process of the EPD 103, the completion of the copying process is notified to the power control unit 202. In response to this, the power control unit 202 sets the operation mode of the main memory 102 to the power-saving mode by setting the memory controller 110 independently from the operation shown in FIG. 11 (step S511). Thereby, it is possible to reduce the power consumption of the main memory 102 during the updating process.

In FIGS. 10 to 12, although the case where the whole screen of the EPD 103 is updated is explained as an example, it is also possible to employ the same processes in a case of partial-updating process in which a part of the screen of the EPD 103 is updated.

Furthermore, as in the first embodiment, in the case of the partial-updating process with a small update-data, or the like, no dividing process is executed and it is only necessary that the initial copying process (1) and the initial updating process (1) in FIG. 10 are executed in this order, and in the middle of the process of updating from the internal memory 107, the main memory 102 is set to the power-saving mode.

In addition, as in the first embodiment, also in the case where independent partial-updating processes are instructed to different areas on the screen, it is possible to reduce the power consumption by the same method using the parallel partial-updating process in the first embodiment.

Furthermore, in the second embodiment, although the structure in that the EPD controller 108 is integrated into the SoC 101 is explained as an example, the structure is not limited to such example while it is also possible to employ a structure in that the EPD controller 108 is arranged in the exterior of the SoC 101.

Third Embodiment

Next, a control device, a data processing device, a controller, a method of controlling thereof, and a computer-readable medium according to a third embodiment will be described in detail with the accompanying drawings.

In the third embodiment, power consumption is reduced by the EPD control device (scheduler) 201 decreasing an operation frequency of the bus 109 during a period except for the copying processes of the divided data to the buffer #0 or #1. In the third embodiment, an example based on the structure of the first embodiment will be explained. In such case, it is possible to obtain an advantage in energy saving by decreasing the operation frequency of the bus 109, in addition to the advantage in energy saving by powering off the main memory 102. The base embodiment is not limited to the first embodiment while the second embodiment and the following other embodiments can be applied. Base configurations of a data processing device and an EPD controller according to the third embodiment are the same as the configurations of the data processing device 100 and the EPD control device 201 shown in FIGS. 1 and 2, and therefore, redundant explanations thereof will be omitted by referring to them.

Figure 13:
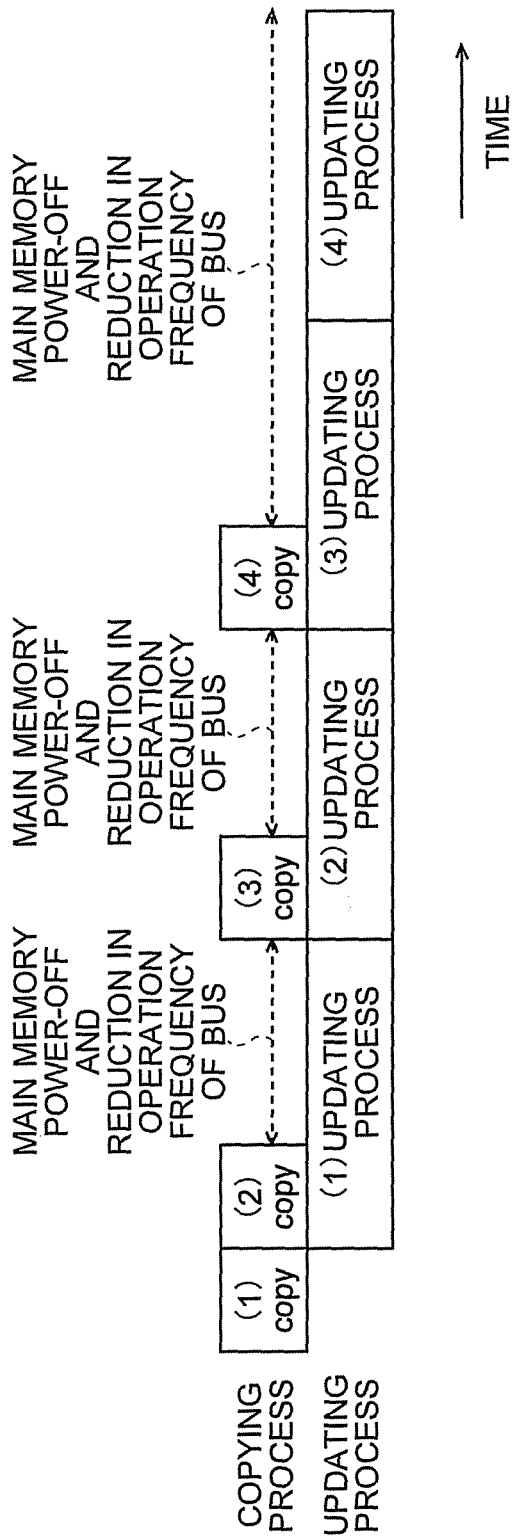
FIG. 13 is an illustration showing an example of operation timing according to a third embodiment.

FIG. 13 is a timing chart showing an example of operation timing scheduled by an EPD control device (scheduler) 201 according to the third embodiment. In FIG. 13, base operation timing can be the same as the operation timing shown in FIG. 3. However, between FIG. 13 and FIG. 3, what is different in structure is that with the case of FIG. 13 the operation frequency of the bus 109 is decreased in addition to power off the main memory 102 during the idle time between the copying processes.

Figure 14:
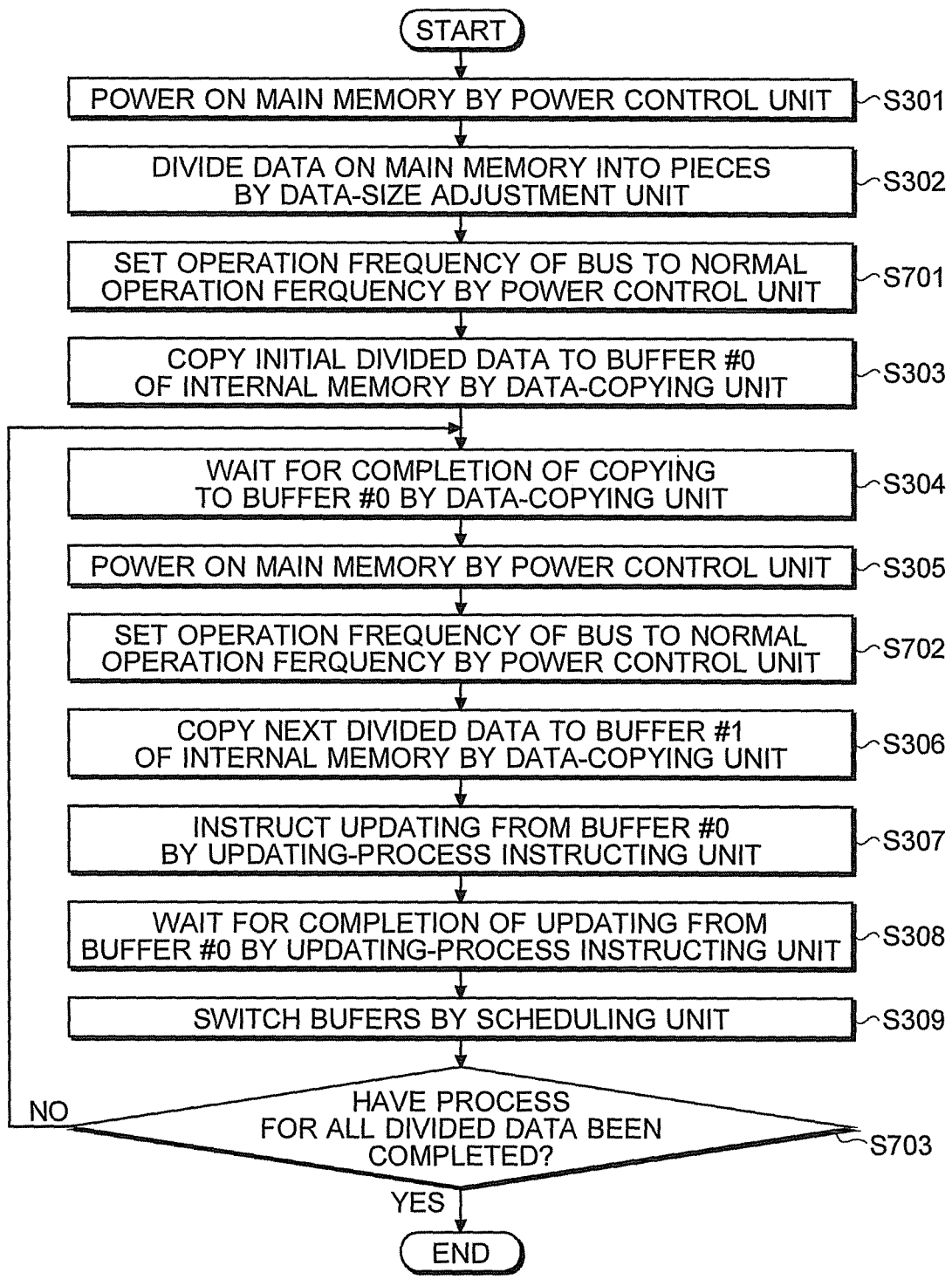
FIG. 14 is an illustration showing an example of a process flow of an EPD control device according to the third embodiment.
Figure 15:
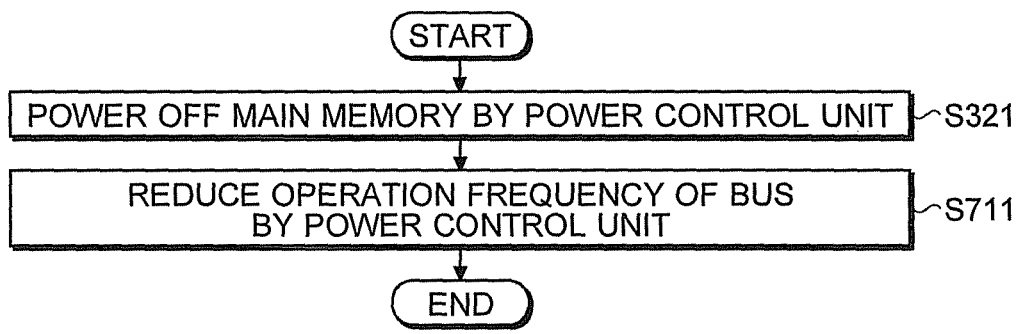
FIG. 15 is an illustration showing an example of another process flow of an EPD control device according to the third embodiment.

Next, a specific example of a process flow of the EPD control device (scheduler) 201 for powering off the main memory 102 during the updating process of the EPD 103 is shown in FIGS. 14 and 15. In FIG. 14, for the same operations as in the operation shown in FIG. 4, redundant explanations thereof will be omitted by referring to them.

As shown in FIG. 14, when an application, a middleware or an OS requests the scheduling unit 206 of the EPD control device (scheduler) 201 to updates e the EPD 103 once using the update-data on the main memory 102, for instance, firstly, by executing the same steps as steps S301 and S302 in FIG. 4, the update-data on the main memory 102 is divided into the plurality of the divided data while the main memory 102 is powered on.

Next, when an operation frequency of the bus 109 is not set to a normal operation frequency, the power control unit 202 sets the operation frequency of the bus 109 to the normal operation frequency (step S701). After that, by executing the same operations as steps S303 to S305 in FIG. 4, the initial divided data is copied to the buffer #0, and the main memory 102 is powered on if the main memory is powered off. Next, when the operation frequency of the bus 109 is not set to the normal operation frequency, the power control unit 202 sets the operation frequency of the bus 109 to the normal operation frequency (step S702). Next, by executing the same operation as steps S306 to S309 in FIG. 4, after completing the updating process with the next divided data, the scheduling unit 206 switches the buffers.

After that, the scheduling unit 206 confirms whether the updating processes for all the divided data are completed or not (step S703), and when the processes are confirmed as being completed (step S703; YES), the scheduling unit 206 finishes the operation. On the other hand, when the processes are confirmed as not being completed (step S703; NO), the scheduling unit 206 returns to step S304 and executes the processes for the next divided data.

As shown in FIG. 15, when the process of copying to the buffer finishes in the middle of the updating process of the EPD 103, the completion of the copying process is notified to the power control unit 202. In response to this, the power control unit 202, independently from the operation shown in FIG. 14, powers off the main memory 102 using the power control device 104 (step S321) and sets the operation frequency of the bus 109 to an operation frequency lower than the normal operation frequency (step S711). To conclude, by powering off the main memory 102, it is possible to reduce power consumption of the main memory even when updating to display. Decreasing the operation frequency of the bus 109 during the updating process can further reduce power consumption.

When a volatile memory such as a DRAM is used as the main memory 102, instead of powering off the main memory 102, it is possible to use the power-saving mode such as a self-refresh mode capable of suppressing power consumption while maintaining data.

In FIGS. 13 to 15, although the case where the whole screen of the EPD 103 is updated is explained as an example, as also explained for in the above-described embodiments, in a case of partial-updating, a case where no division of the update-data is required because the update-data falls within the capacity of the internal memory, and a case where the parallel partial-updating of the EPD controller is used for the independent partial updating processes directed to different areas on the screen, the same processes can be applied.

Furthermore, in the third embodiment, although the structure in that the EPD controller 108 is integrated into the SoC 101 is explained as an example, the structure is not limited to such example while it is also possible to employ a structure in that the EPD controller 108 is arranged in the exterior of the SoC 101.

Fourth Embodiment

Next, a control device, a data processing device, a controller, a method of controlling thereof, and a computer-readable medium according to a fourth embodiment will be described in detail with the accompanying drawings.

In the fourth embodiment, the EPD control device (scheduler) executes a preprocess for preparing update-data which is decided to be displayed next or has a strong possibility of being displayed next (hereinafter to be referred to as next update-data) while executing a copying process of data being a current display target (hereinafter to be referred to as current update-data). According to such structure, it is possible to hide a delay caused by the preprocess with respect to the next update-data behind the copying process. As described above, the preprocess may includes a conversion process for converting color data to grayscale data or monochrome data, a selection process for automatically selecting a waveform optimal for updating the EPD, and so forth.

Figure 16:
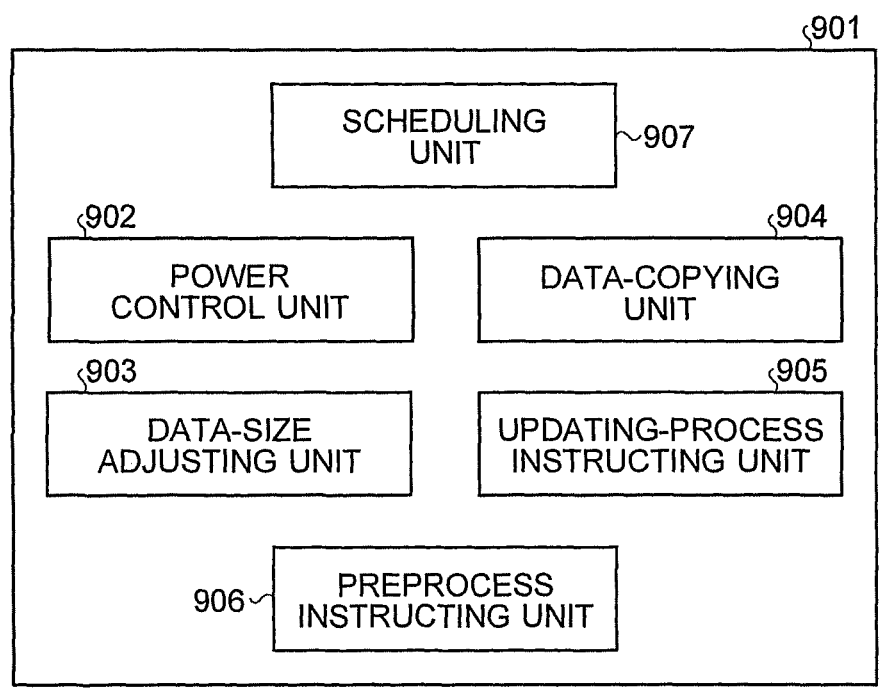
FIG. 16 is a schematic block diagram showing an EPD control device according to a fourth embodiment.

A base configuration of a data processing device according to the fourth embodiment can be the same as the configuration of the data processing device 100 shown in FIG. 1. A EPD control device according to the fourth embodiment has a structure shown in FIG. 16. FIG. 16 is a block diagram showing an outline structure of an EPD control device (scheduler) 901 according to the fourth embodiment. The EPD control device (scheduler) 901 can be a device driver of an OS operating on the CPU 106.

As shown in FIG. 16, the EPD control device (scheduler) 901 has a scheduling unit 907, a power control unit 902, a data-size adjusting unit 903, a data-copying unit 904, an updating-process instructing unit 905 and a preprocess instructing unit 906. The power control unit 902, the data-size adjusting unit 903, the data-copying unit 904 and the updating-process instructing unit 905 can be the same as the power control unit 202, the data-size adjusting unit 203, the data-copying unit 204 and the updating-process instructing unit 205.

The preprocess instructing unit 906 instructs the accelerator 111 (see FIG. 1) to execute preprocess with respect to a next update-data. When the scheduling unit 907 is instructed to update the whole screen of the EPD 103 from an application, a middleware, an OS, or the like, operating on the data processing device 100, the scheduling unit 907 makes the power control unit 902, the data-size adjusting unit 903, the data-copying unit 904, the updating-process instructing unit 905 and the preprocess instructing unit 906 operate in cooperation with one another. According to such operation, the scheduling unit 907 schedules so that update-data on the main memory 102 is divided in pieces, the divided data are sequentially copied to two buffers #0 and #1 on the internal memory 107 alternately, the updating processes directed to the EPD 103 from the buffer #0 or #1 are executed to the EPD controller 108, and the preprocess with respect to the next update-data on the main memory 102 is executed.

Figure 17:
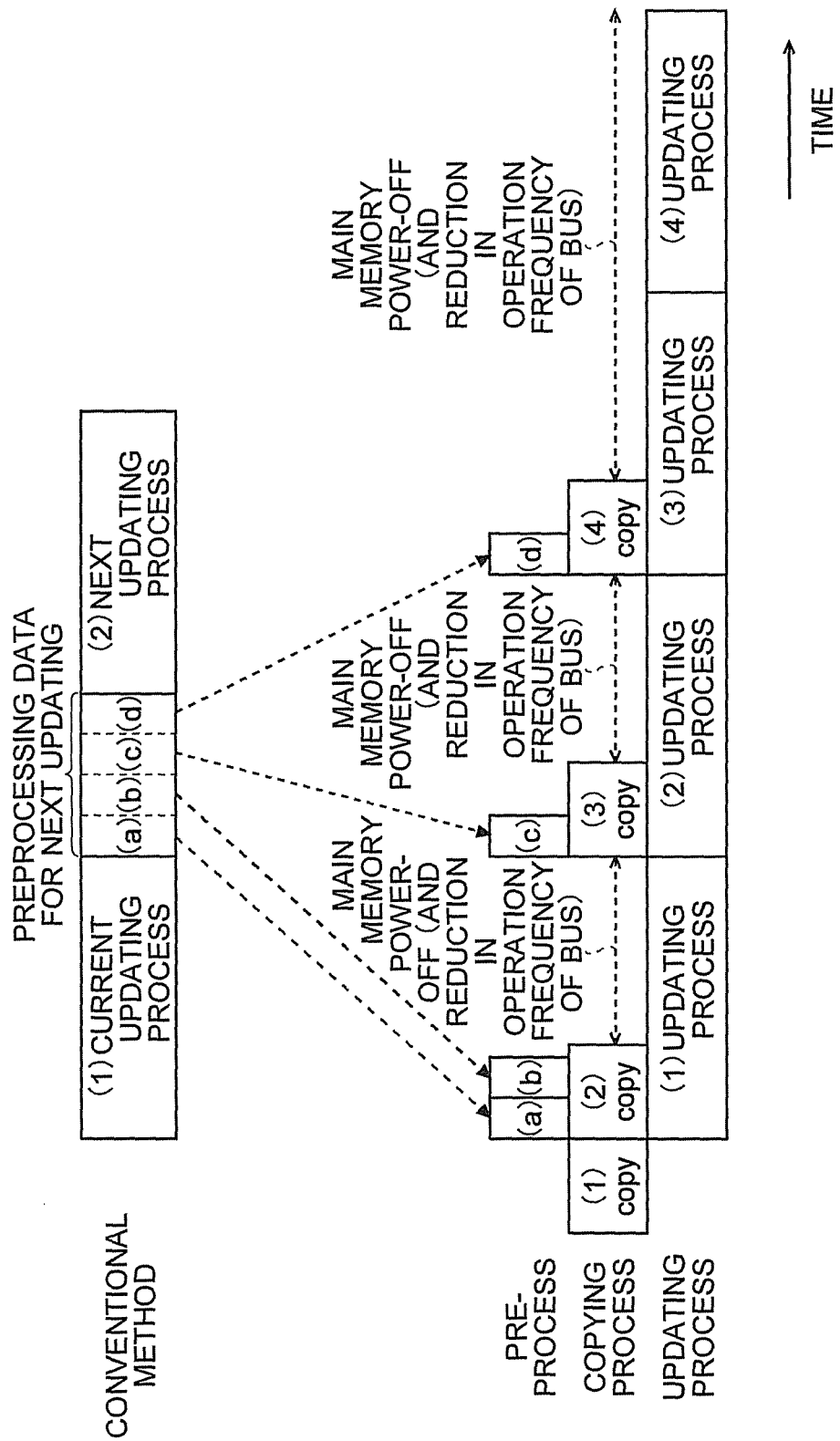
FIG. 17 is an illustration showing an example of operation timing according to the fourth embodiment.

FIG. 17 is a timing chart showing an example of operation timing scheduled by the EPD control device (scheduler) 901 according to the fourth embodiment. As shown in FIG. 17, the preprocess with respect to the next update-data can be executed in parallel to the copying process. Thereby, it is possible to hide the preprocess with respect to the next update-data. In addition, base operation timing shown in FIG. 17 can be the same as the operation timing shown in FIG. 3. Furthermore, as shown in FIG. 17, it is possible to decrease the operation frequency of the bus 109 during the idle time between the copying processes in addition to power off the main memory 102.

Figure 18:
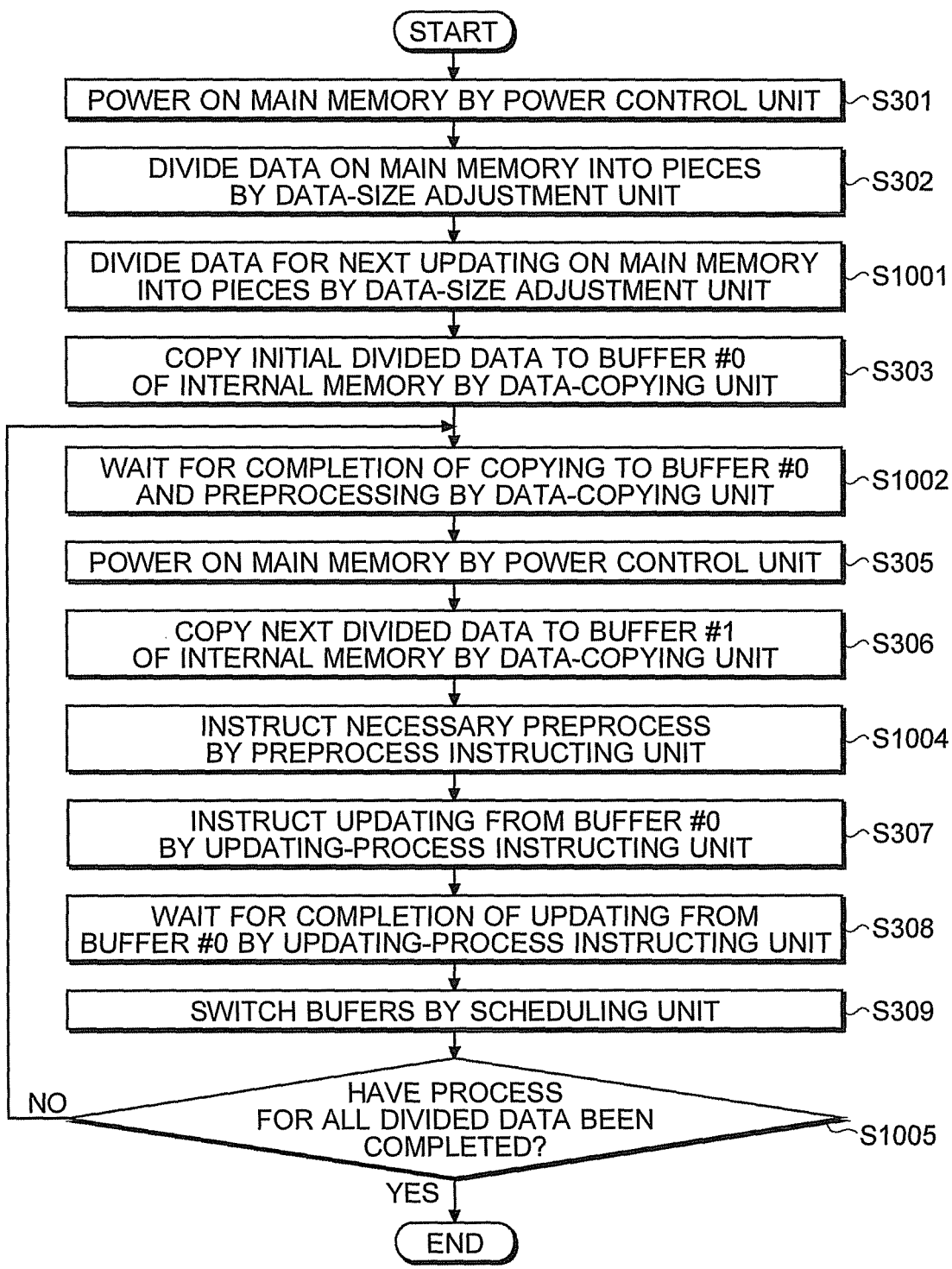
FIG. 18 is an illustration showing an example of a process flow of the EPD control device according to the fourth embodiment.
Figure 19:
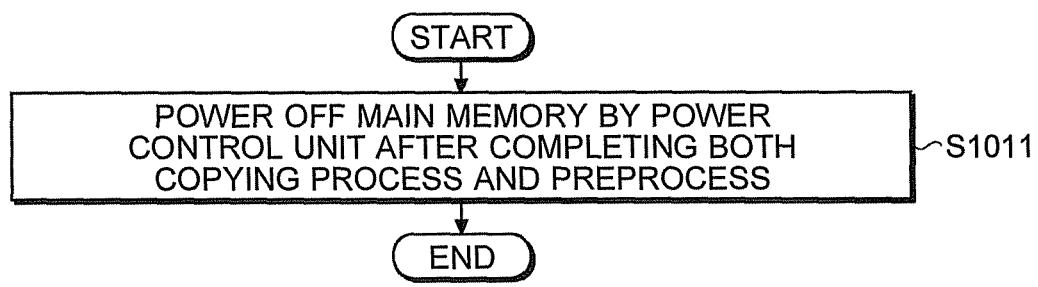
FIG. 19 is an illustration showing an example of another process flow of the EPD control device according to the fourth embodiment.

Next, a specific example of a process flow of the EPD control device (scheduler) 901 for hiding the preprocess with respect to the next update-data while powering off the main memory 102 during the updating process of the EPD 103 is shown in FIGS. 18 and 19. In FIG. 18, for the same operations as in the operation shown in FIG. 4, redundant explanations thereof will be omitted by referring to them.

As shown in FIG. 18, when an application, a middleware or an OS requests the scheduling unit 907 of the EPD control device (scheduler) 901 to update the EPD 103 once using the update-data on the main memory 102, for instance, firstly, by executing the same steps as steps S301 and S302 in FIG. 4, the update-data on the main memory 102 is divided into the plurality of the divided data while the main memory 102 is powered on.

Next, the data-size adjusting unit 903 divides the original data on the main memory 102, which is a source of the next update-data, into a plurality of divided data, the number of divisions being the same as that of the current update-data (step S1001). Here, the data being a source of update-data is un-preprocessed data written in a frame buffer from an application, a middleware, or the like, for instance. Therefore, preprocessed data becomes the update-data.

Next, by executing the same operation as step S303 in FIG. 4, the data-copying unit 904 copies the initial data among the plurality of the divided data to the buffer #0 on the internal memory 107, and then, when the process of copying to the buffer #0 on the internal memory 107 and the preprocess with respect to the data being the source of the next update-data is being executed, the data-copying unit 904 waits for completions of the copying process and the preprocess (step S1002). However, if there is no preprocess to be executed, naturally it is not necessary to wait for the completions thereof.

After completing the copying process and the preprocess, next, when the main memory 102 is not powered on, by executing the same operation as steps S305 and S306 in FIG. 4, the power control unit 902 powers on the main memory 102, and when the next divided data for which copying process has not been finished remains, the data-copying unit 904 copies the divided data to the buffer #1.

Next, when there is a preprocess to be executed, the preprocess instructing unit 906 instructs the accelerator 111 to execute the preprocess (step S1004). The preprocess to be executed is, when a copying process of N-th divided data (N is a natural number) is started, a preprocess with respect to the first to N-th divided data among the data being the source of the next update-process divided in step S1001. It is also possible that the operation in step S1004 is executed before the operation in step S306.

Next, by executing the same operation as steps S307 to S309 in FIG. 4, after completing the updating process with the next divided data, the scheduling unit 907 switches the buffers.

After that, the scheduling unit 907 confirms whether the updating processes for all the divided data are completed or not (step S1005), and when the processes are confirmed as being completed (step S1005; YES), the scheduling unit 907 finishes the operation. On the other hand, when the processes are confirmed as not being completed (step S1005; NO), the scheduling unit 907 returns to step S1002 and executes the processes for the next divided data.

As shown in FIG. 19, when the process of copying to the buffer #0 or #1 and the preprocess with respect to the data being the source of the next update-data finish in the middle of the updating process of the EPD 103, the completions of the copying process and the preprocess are notified to the power control unit 902. In response to this, the power control unit 902 powers off the main memory 102 using the power control device 104 independently from the operation shown in FIG. 18 (step S1011). Thereby, it is possible to reduce the power consumption of the main memory 102 during the updating process.

When a volatile memory such as a DRAM is used as the main memory 102, instead of powering off the main memory 102, it is possible to use the power-saving mode such as a self-refresh mode capable of suppressing power consumption while maintaining data.

The preprocess may be a process of copying a waveform necessary for the next updating to the internal memory 107. It is not necessary that the preprocess is a process for preparing the next update-data. Furthermore, it is not necessary that the preprocess is a process related to image processing. For instance, preprocess can be any kind of process, and if there is a process ahead to be executed on the data processing device 100 or a process having a strong possibility to be executed ahead on the data processing device 100, such process can be executed in parallel with the copying process. In such case, a process to be overlapping the copying process may be a process created by dividing a relatively heavy process or a process created by combining relatively light processes.

In FIGS. 17 to 19, although the case where the whole screen of the EPD 103 is updated is explained as an example, as also explained for in the above-described embodiments, in a case of partial-updating, a case where no division of the update-data is required because the update-data falls within the capacity of the internal memory, and a case where the parallel partial-updating of the EPD controller is used for the independent partial updating processes directed to different areas on the screen, the same processes can be applied.

Furthermore, in the fourth embodiment, although the structure in that the EPD controller 108 is integrated into the SoC 101 is explained as an example, the structure is not limited to such example while it is also possible to employ a structure in that the EPD controller 108 is arranged in the exterior of the SoC 101.

Fifth Embodiment

Next, a control device, a data processing device, a controller, a method of controlling thereof, and a computer-readable medium according to a fifth embodiment will be described in detail with the accompanying drawings.

In the fifth embodiment, as the fourth embodiment, the EPD control device (scheduler) executes a preprocess while executing a copying process. Although in the fourth embodiment, the preprocess with respect to the next update-data is overlapped with the copying process of the current update-data, in the fifth embodiment, a preprocess with respect to the current update-data is overlapped with the copying process of the current update-data. According to such structure, it is possible to hide a delay caused by the preprocess with respect to the update-data behind the copying process.

A base configuration of a data processing device according to the fifth embodiment can be the same as the configuration of the data processing device 100 shown in FIG. 1. Furthermore, a base configuration of an EPD control device (scheduler) according to the fifth embodiment can be the same as the configuration of the EPD control device (scheduler) 901 shown in FIG. 16.

Figure 20:
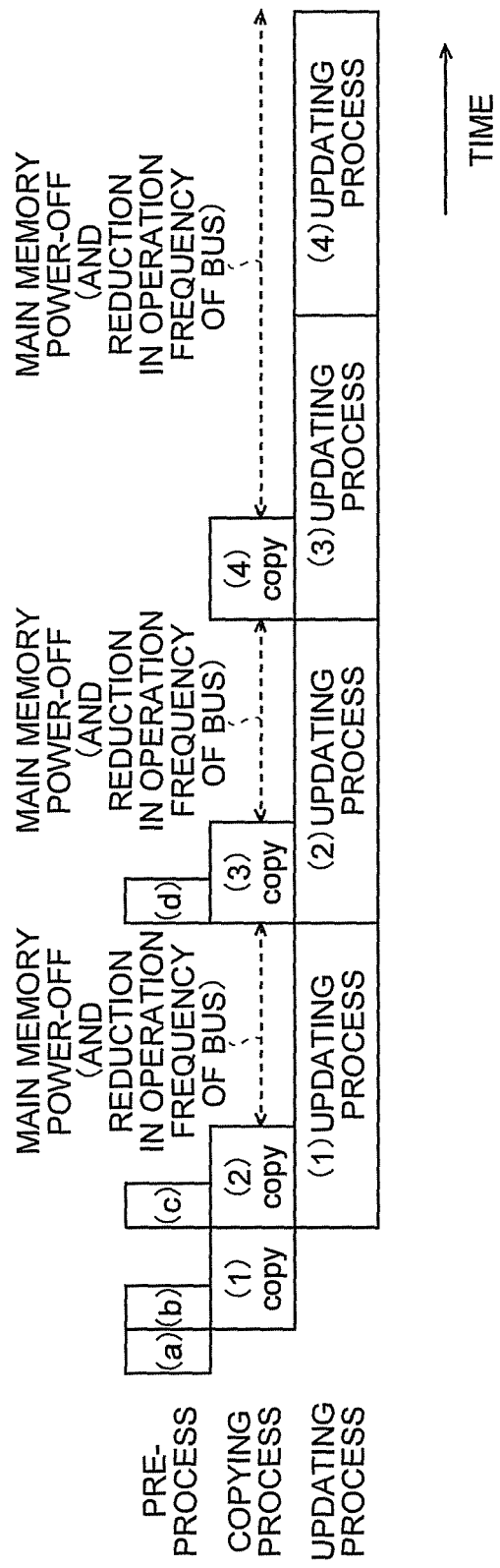
FIG. 20 is an illustration showing an example of operation timing according to a fifth embodiment.

FIG. 20 is a timing chart showing an example of operation timing scheduled by the EPD control device (scheduler) 901 according to the fifth embodiment. As shown in FIG. 20, at least a part of the preprocess with respect to the current update-data can be executed while executing the copying process of the same update-data. Thereby, it is possible to hide at least a part of the preprocess with respect to the update-data behind the copying process. For instance, in the example shown in FIG. 20, preprocesses for the second and the subsequent data among the data being the source of the update-data divided in pieces are overlapped with copying processes. Therefore, the preprocesses for the second and the subsequent data among the divided update-data are hidden. In FIG. 20, base operation timing can be the same as the operation timing shown in FIG. 3. Furthermore, as shown in FIG. 20, it is possible to decrease the operation frequency of the bus 109 during the idle time between the copying processes in addition to power off the main memory 102.

Figure 21:
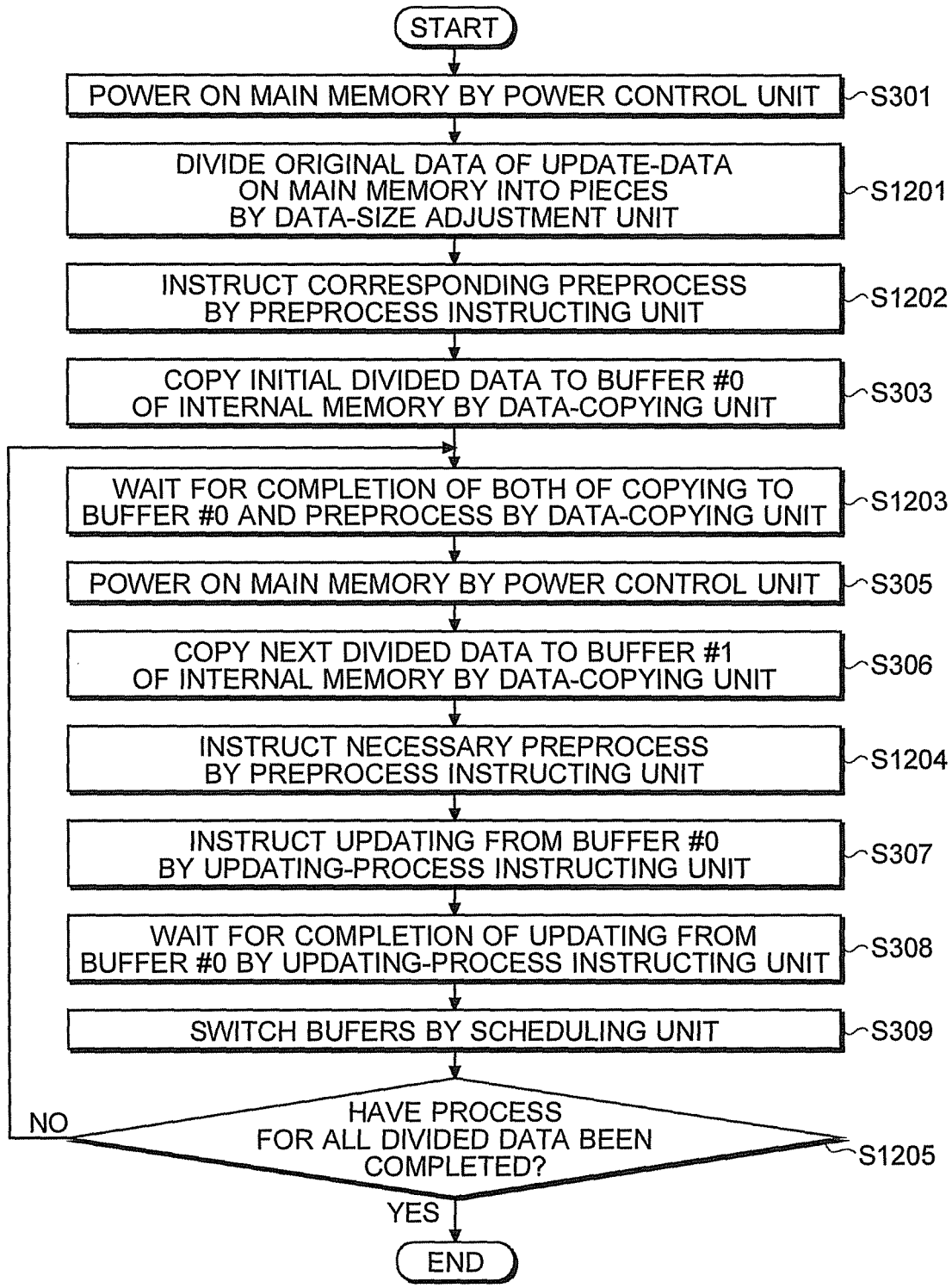
FIG. 21 is an illustration showing an example of a process flow of an EPD control device according to the fifth embodiment.
Figure 22:
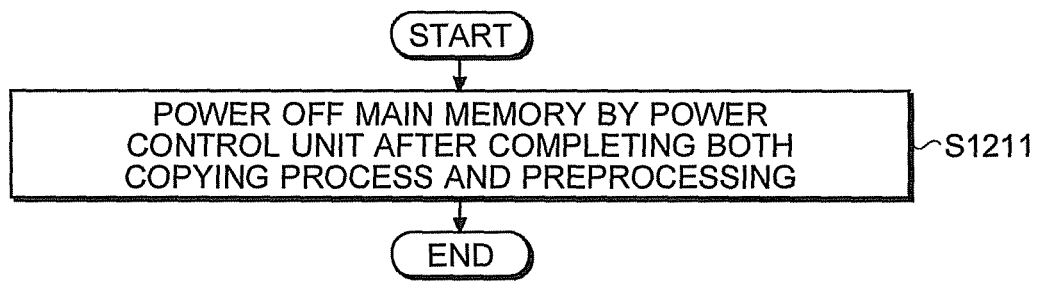
FIG. 22 is an illustration showing an example of another process flow of the EPD control device according to the fifth embodiment.

Next, a specific example of a process flow of the EPD control device (scheduler) 901 for hiding at least a part of the preprocess with respect to the current update-data while powering off the main memory 102 during the updating process of the EPD 103 is shown in FIGS. 21 and 22. In FIG. 21, for the same operations as in the operation shown in FIG. 4, redundant explanations thereof will be omitted by referring to them.

As shown in FIG. 21, when an application, a middleware or an OS requests the scheduling unit 907 of the EPD control device (scheduler) 901 to update the EPD 103 once using the update-data on the main memory 102, for instance, firstly, by executing the same steps as step S301 in FIG. 4, the main memory 102 is powered on.

Next, the data-size adjusting unit 903 divides the data being the source of the current update-data on the main memory 102 into the plurality of the divided data (step S1201). Then, when there is a preprocess to be executed, the preprocess instructing unit 906 instructs the accelerator 111 to execute the preprocess (step S1202).

Next, by executing the same operation as step S303 in FIG. 4, the data-copying unit 904 copies the initial data among the plurality of the divided data to the buffer #0 on the internal memory 107, and then, when the process of copying to the buffer #0 on the internal memory 107 and the preprocess with respect to the data being the source of the next update-data is being executed, the data-copying unit 904 waits for completions of the copying process and the preprocess (step S1203). However, if there is no copying process and preprocess to be executed, naturally it is not necessary to wait for the completions thereof.

After completing the copying process and the preprocess, next, when the main memory 102 is not powered on, by executing the same operation as steps S305 and S306 in FIG. 4, the power control unit 902 powers on the main memory 102, and when the next divided data for which copying process has not been finished remains, the data-copying unit 904 copies the divided data to the buffer #1.

Next, when there is a preprocess to be executed, the preprocess instructing unit 906 instructs the accelerator 111 to execute the preprocess (step S1204). It is also possible that the operation in step S1204 is executed before the operation in step S306.

Next, by executing the same operation as steps S307 to S309 in FIG. 4, after completing the updating process with the next divided data, the scheduling unit 907 switches the buffers.

After that, the scheduling unit 907 confirms whether the updating processes for all the divided data are completed or not (step S1205), and when the processes are confirmed as being completed (step S1205; YES), the scheduling unit 907 finishes the operation. On the other hand, when the processes are confirmed as not being completed (step S1205; NO), the scheduling unit 907 returns to step S1203 and executes the processes for the next divided data.

As shown in FIG. 22, when the process of copying to the buffer #0 or #1 and the preprocess with respect to the data being the source of the next update-data finish in the middle of the updating process of the EPD 103, the completions of the copying process and the preprocess are notified to the power control unit 902. In response to this, the power control unit 902 powers off the main memory 102 using the power control device 104 independently from the operation shown in FIG. 21 (step S1211). Thereby, it is possible to reduce the power consumption of the main memory 102 during the updating process.

When a volatile memory such as a DRAM is used as the main memory 102, instead of powering off the main memory 102, it is possible to use the power-saving mode such as a self-refresh mode capable of suppressing power consumption while maintaining data.

In FIGS. 20 to 22, although the case where the whole screen of the EPD 103 is updated is explained as an example, as also explained for in the above-described embodiments, in a case of partial-updating, a case where no division of the update-data is required because the update-data falls within the capacity of the internal memory, and a case where the parallel partial-updating of the EPD controller is used for the independent partial updating processes directed to different areas on the screen, the same processes can be applied.

Furthermore, in the fifth embodiment, although the structure in that the EPD controller 108 is integrated into the SoC 101 is explained as an example, the structure is not limited to such example while it is also possible to employ a structure in that the EPD controller 108 is arranged in the exterior of the SoC 101.

Sixth Embodiment

Next, a control device, a data processing device, a controller, a method of controlling thereof, and a computer-readable medium according to a sixth embodiment will be described in detail with the accompanying drawings.

Although in the above-described embodiments, the cases where the internal memory 107 has two buffers have been explained, in the sixth embodiment, a case where the internal memory 107 has a single buffer will be explained. Base configurations of a data processing device and an EPD controller according to the sixth embodiment are the same as the configurations of the data processing device 100 and the EPD control device (scheduler) 201 shown in FIGS. 1 and 2, and therefore, redundant explanations thereof will be omitted by referring to them.

Figure 23:
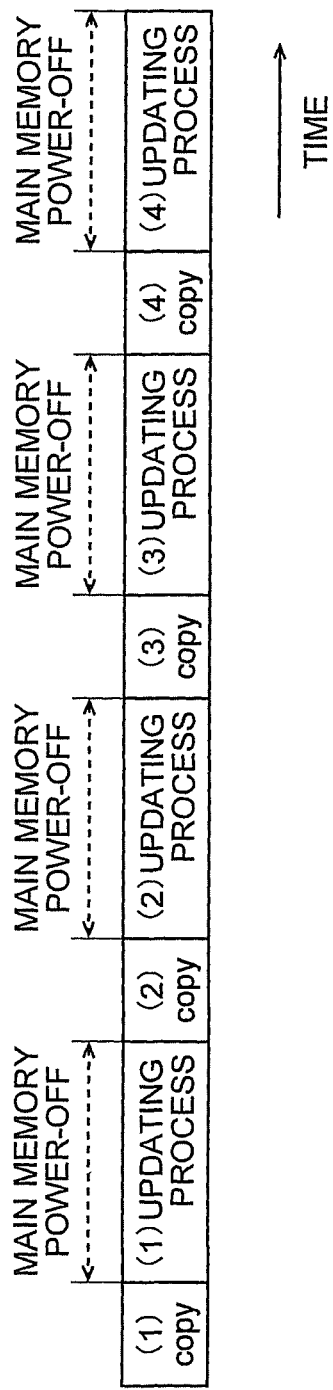
FIG. 23 is an illustration showing an example of operation timing according to a sixth embodiment.

FIG. 23 is a timing chart showing an example of operation timing scheduled by the EPD control device (scheduler) 901 according to the sixth embodiment. As shown in FIG. 23, in the case where the internal memory 107 has a single buffer, copying processes and updating processes are executed alternately. In such case, it is possible to power off the main memory 102 during the idle time between the copying processes, i.e., during the process of updating the EPD 103. In this way, even with a single buffer, it is possible to reduce the power consumption of the main memory 102. In addition to power off the main memory 102, it is possible to decrease the operation frequency of the bus 109.

Figure 24:
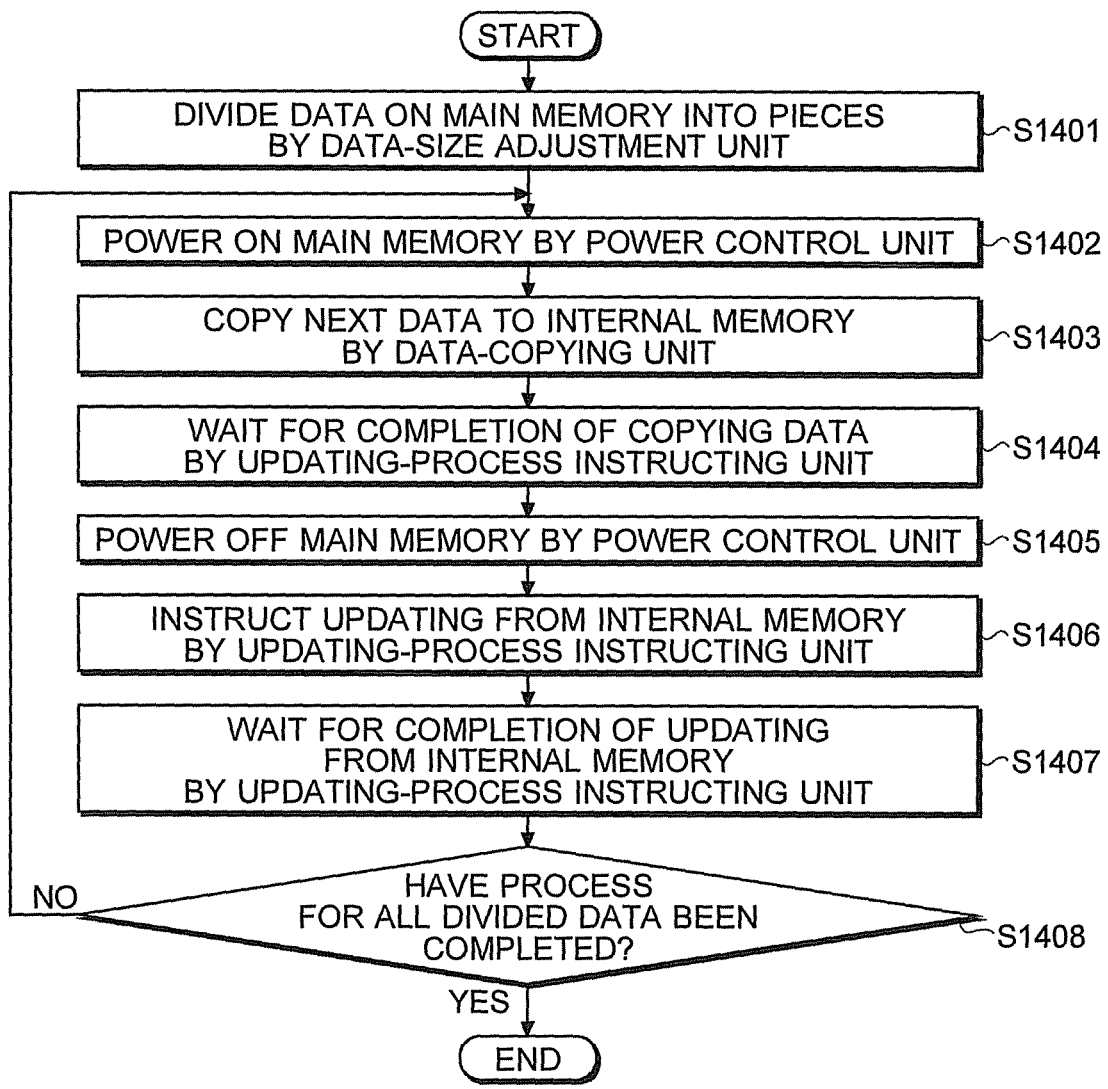
FIG. 24 is an illustration showing an example of a process flow of an EPD control device according to the sixth embodiment.

Next, a specific example of a process flow of the EPD control device (scheduler) 201 for setting the main memory 102 to power off during the updating process of the EPD 103 using a single buffer is shown in FIG. 24.

As shown in FIG. 24, when an application, a middleware or an OS requests the scheduling unit 206 of the EPD control device (scheduler) 201 to update the EPD 103 once using the update-data on the main memory 102, for instance, firstly, the data-size adjusting unit 203 divides the update-data on the main memory 102 into the plurality of the divided data (step S1401).

Next, when the main memory 102 is not powered on, in order to prepare for a possible follow-on copying process, the power control unit 202 powers on the main memory 102 using the power control device 104 (step S1402).

Next, the data-copying unit 204 executes a copying process for copying the initial divided data among the divided data for which copying process has not been finished among the plurality of the divided data to the internal memory 107 (step S1403). After that, the data-copying unit 204 waits for the completion of the process of copying to the internal memory 107 (step S1404).

After completing the process of copying to the internal memory 107, next, the power control unit 202 powers off the main memory 102 (step S1405). Thereby, it is possible to power off the main memory 102 during the updating process.

Next, the updating-process instructing unit 205 instructs the EPD controller 108 to execute a process of updating based on the divided data stored in the internal memory 107 (step S1406), and then waits the completion of the updating process (step S1407). The order of steps S1405 and S1406 can be reversed.

After that, the scheduling unit 206 confirms whether the updating processes for all the divided data are completed or not (step S1408), and when the processes are confirmed as being completed (step S1408; YES), the scheduling unit 206 finishes the operation. On the other hand, when the processes are confirmed as not being completed (step S1408; NO), the scheduling unit 206 returns to step S1402 and executes the processes for the next divided data.

When a volatile memory such as a DRAM is used as the main memory 102, instead of powering off the main memory 102, it is possible to use the power-saving mode such as a self-refresh mode capable of suppressing power consumption while maintaining data.

In FIGS. 23 and 24, although the case where the whole screen of the EPD 103 is updated is explained, it is also possible to employ the same processes in a case of partial-updating process in which a part of the screen of the EPD 103 is to be updated. Furthermore, in a case where dividing the update-data is not necessary because the update-data falls within the capacity of the buffer of the internal memory 107, as the case with the first embodiment, only the initial copying process (1) and the initial updating process (1) in FIG. 23 need to be executed, and the main memory 102 can be powered off in the middle of the updating process.

Furthermore, in the sixth embodiment, although the structure in that the EPD controller 108 is integrated into the SoC 101 is explained as an example, the structure is not limited to such example while it is also possible to employ a structure in that the EPD controller 108 is arranged in the exterior of the SoC 101.

Seventh Embodiment

Next, a control device, a data processing device, a controller, a method of controlling thereof, and a computer-readable medium according to a seventh embodiment will be described in detail with the accompanying drawings.

In the seventh embodiment, a case where parts of the screen of the EPD 103 are updated will be explained.

Base configurations of a data processing device and an EPD controller according to the seventh embodiment are the same as the configurations of the data processing device 100 and the EPD control device (scheduler) 201 shown in FIGS. 1 and 2, and therefore, redundant explanations thereof will be omitted by referring to them.

Figure 25:
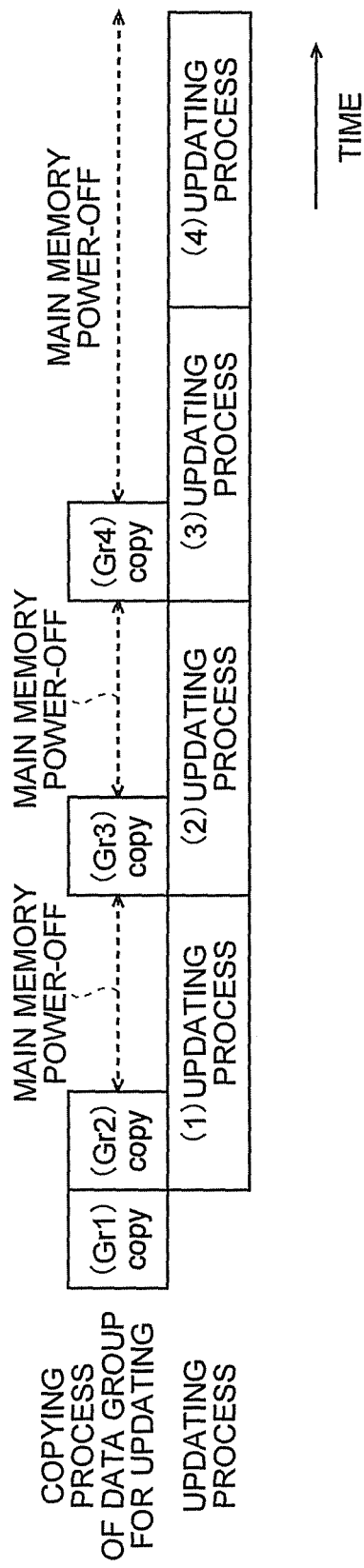
FIG. 25 is an illustration showing an example of operation timing according to a seventh embodiment.

FIG. 25 is a timing chart showing an example of operation timing scheduled by the EPD control device (scheduler) 901 according to the seventh embodiment. In FIG. 25, a case where four data sets are created by grouping a plurality of update-data is shown as an example. Here, a data set is, as the divided data, a unit of data to be copied to the internal memory 107 at one time by the data-copying unit 204. However, it is not limited to such case while it is also possible to create a single data set by grouping a plurality of update-data. Furthermore, in creating the data set, depending on a size of update-data being a target of grouping, one update-data may be defined as one data set. Moreover, when two buffers are allocated in the internal memory 107, for instance, a size of each data set may be set within a half of the capacity of the internal memory 107.

By executing the updating process while grouping the update-data into the data sets, it is possible to reduce the number of the updating processes and the number of the preprocesses being necessary for the updating processes, and when the updating processes are executed in parallel, it is also possible to increase a parallelism thereof.

As shown in FIG. 25, base operation timing for one or more data sets created by grouping one or more update-data can be the same as the operation timing for the divided update-data shown in FIG. 3. In FIG. 25, after completing the copying process of a data set (Gr1), updating process (1) included in the data set (Gr1) is executed. Furthermore, while the updating process (1) is executing, a copying process of a next data set (Gr2) is executed. According to such operation, as the above-described embodiments, because it is possible to create the idle time in which there is no memory access between the copying processes, it is possible to power off the main memory 102. As a result, it is possible to reduce the power consumption. Furthermore, as shown in FIG. 25, by overlapping the copying process and the updating process, it is possible to hide a delay caused by the copying process. In addition to power off the main memory 102, it is possible to decrease the operation frequency of the bus 109.

Figure 26:
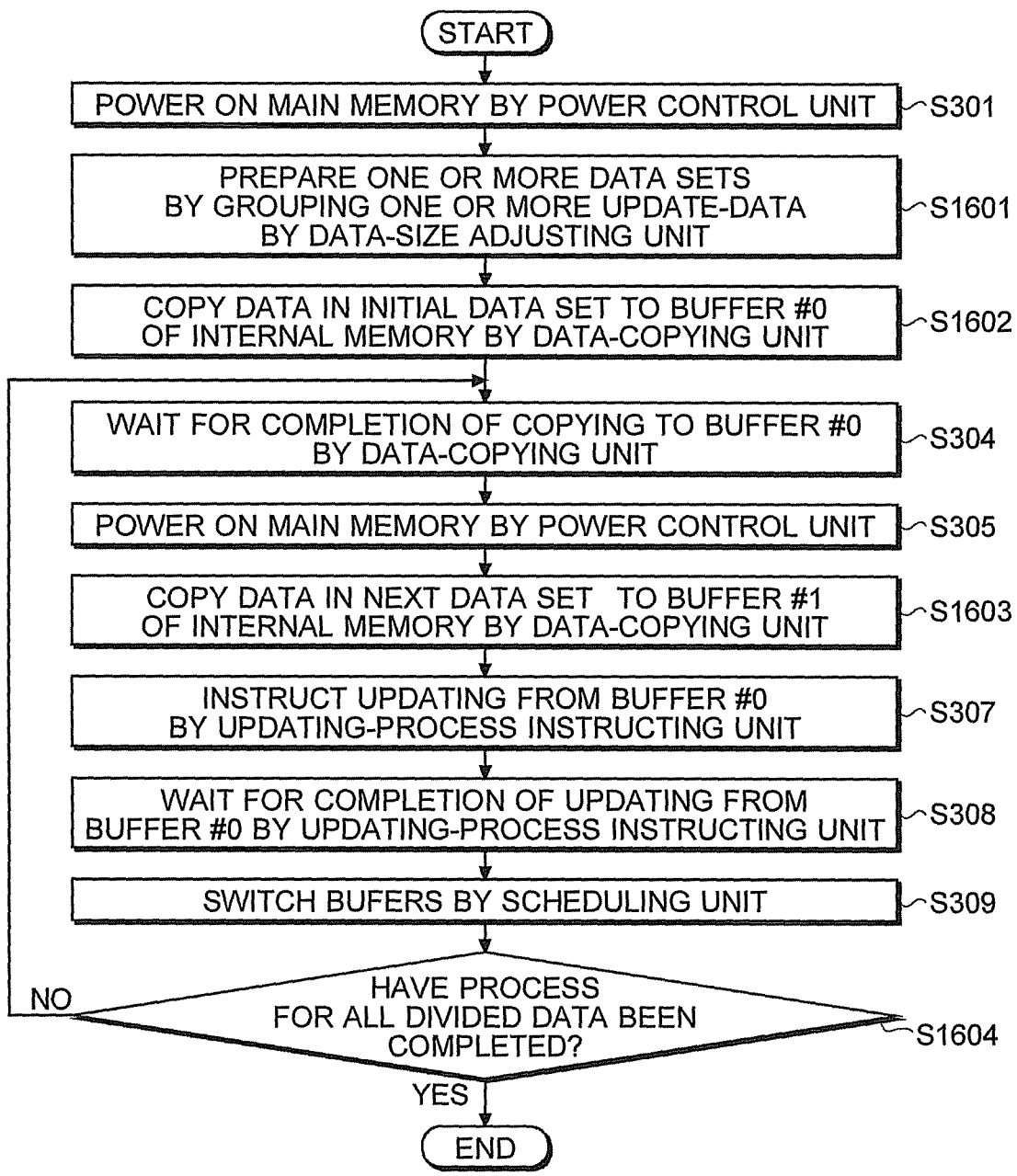
FIG. 26 is an illustration showing an example of a process flow of an EPD control device according to the seventh embodiment.
Figure 27:
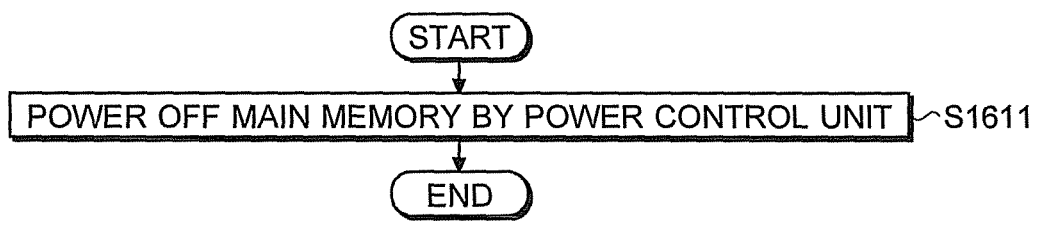
FIG. 27 is an illustration showing an example of another process flow of the EPD control device according to the seventh embodiment.

Next, a specific example of a process flow of the EPD control device (scheduler) 201 for setting the operation mode of the main memory 102 as a power-saving mode during the updating process of the EPD 103 with respect to four data sets created by grouping one or more update-data is shown in FIGS. 26 and 27. In FIG. 26, for the same operations as in the operations shown in the FIG. 4, redundant explanations thereof will be omitted by referring to them.

As shown in FIG. 26, when an application, a middleware or an OS requests the scheduling unit 206 of the EPD control device (scheduler) 201 to update a plurality of areas in the EPD 103 using a plurality of the update-data on the main memory 102, for instance, firstly, in order to brace for a possible follow-on copying process, the power control unit 202 powers on the main memory 102 using the memory controller 110.

Next, the data-size adjusting unit 203 creates one or more (here, four) data sets by grouping the plurality of the update-data on the main memory 102 (step S1601). Next, the data-copying unit 204 executes a copying process for copying the initial data set among the plurality of the data sets to the buffer #0 on the internal memory 107 (step S1602). After that, by executing the same operations as steps S304 and S305 in FIG. 4, after completing the initial data set to the buffer #0, the main memory 102 is powered on if the main memory is powered off.

Then, when there is still the next data set for which copying process has not been finished, the data-copying unit 204 copies the next data set to the buffer #1 (step S1603). Next, by executing the same operation as steps S307 to S309 in FIG. 4, the updating process is executed before the process of copying to the buffer #1 is completed, and after the updating process is completed, the scheduling unit 206 switches the buffers.

After that, the scheduling unit 206 confirms whether the updating processes for all the data sets are completed or not (step S1604), and when the processes are confirmed as being completed (step S1604; YES), the scheduling unit 206 finishes the operation. On the other hand, when the processes are confirmed as not being completed (step S1604; NO), the scheduling unit 206 returns to step S304 and executes the processes for the next data set.

As shown in FIG. 27, when the process of copying to the buffer finishes in the middle of the updating process of the EPD 103, the completions of the copying process is notified to the power control unit 202. In response to this, the power control unit 202 powers off the main memory 102 using the power control device 104 independently from the operation shown in FIG. 26 (step S1611). Thereby, it is possible to power off the main memory 102 during the updating process.

As the above-described embodiments, in the case where when the updating processes are executed in parallel using the parallel partial-updating, the power consumption of the main memory 102 during the idle time except for during the copying process is reduced by powering off the main memory 102, the same processes can be applied.

When a volatile memory such as a DRAM is used as the main memory 102, instead of powering off the main memory 102, it is possible to use the power-saving mode such as a self-refresh mode capable of suppressing power consumption while maintaining data.

As with the above-described fourth and fifth embodiments, in the seventh embodiment, it is possible to have the preprocess with respect to the data set created by grouping the next or current update-data overlapped with the copying process. Furthermore, in the seventh embodiment, although the structure in that the EPD controller 108 is integrated into the SoC 101 is explained as an example, the structure is not limited to such example while it is also possible to employ a structure in that the EPD controller 108 is arranged in the exterior of the SoC 101.

Eight Embodiment

Next, a control device, a data processing device, a controller, a method of controlling thereof, and a computer-readable medium according to an eighth embodiment will be described in detail with the accompanying drawings.

In the eighth embodiment, a case where the bus 109, the EPD controller 108 and the internal memory 107 in the data processing device 100, according to the first embodiment, for instance, are defined as an EPD-associated power domain will be explained as an example. In such case, it is possible to structure such that the EPD-associated power domain is fed during the updating process of the EPD 103. Thereby, because it is possible to shut off power feed to another units in the SoC 101, it is possible to further reduce the power consumption.

Figure 28:
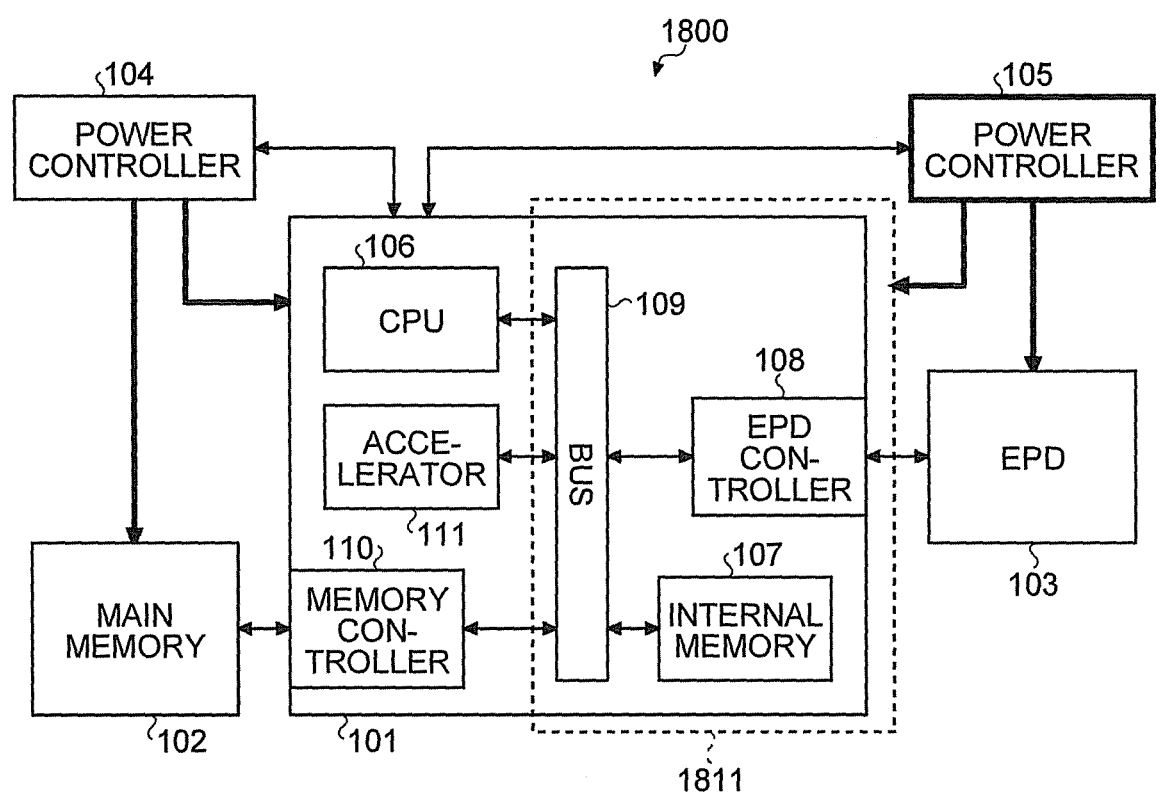
FIG. 28 is a schematic block diagram showing a data processing device according to an eighth embodiment.

FIG. 28 is a block diagram showing an example of an outline structure of a data processing device 1800 according to the eighth embodiment. In FIG. 28, for the same configuration as that of FIG. 1, redundant explanations will be omitted by referring to them using the same reference numbers. Furthermore, a base configuration of an EPD control device (scheduler) according to the eighth embodiment is the same as the configuration of the EPD control device 201 shown in FIG. 2, and therefore, redundant explanations thereof will be omitted by referring to them.

As shown in FIG. 28, the data processing device 1800 according to the eighth embodiment has the same structure as the data processing device 100 shown in FIG. 1. However, in the data processing device 1800, the bus 109, the EPD controller 108 and the internal memory 107 are managed as a single EPD-associated power domain 1811. The power control device 105 feeds power to the EPD-associated power domain 1811 in addition to the EPD 103. The power control device 104 feeds power to the main memory 102 and EPD power domains except for the EPD-associated power domain 1811.

Figure 29:
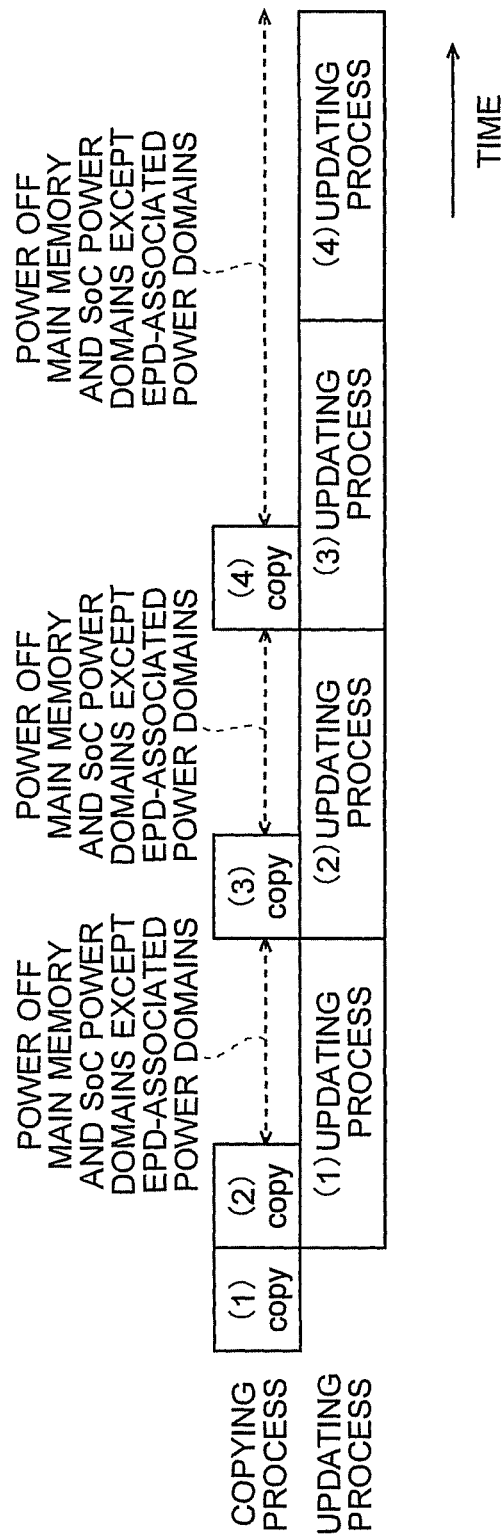
FIG. 29 is an illustration showing an example of operation timing according to the eighth embodiment.

FIG. 29 is a timing chart showing an example of operation timing scheduled by an EPD control device (scheduler) 201 according to the eighth embodiment. In FIG. 29, base operation timing can be the same as the operation timing shown in FIG. 3. However, between FIG. 29 and FIG. 3, what is different is that with the case of FIG. 29 the EPD power domains except for the EPD-associated power domain 1811 in the SoC 101 are powered off in addition to the main memory 102 being powered off during the idle time between the copying processes. It is possible to decrease the operation frequency of the bus 109 in addition to power off the main memory 102 and the EPD power domains except for the EPD-associated power domain 1811.

Figure 30:
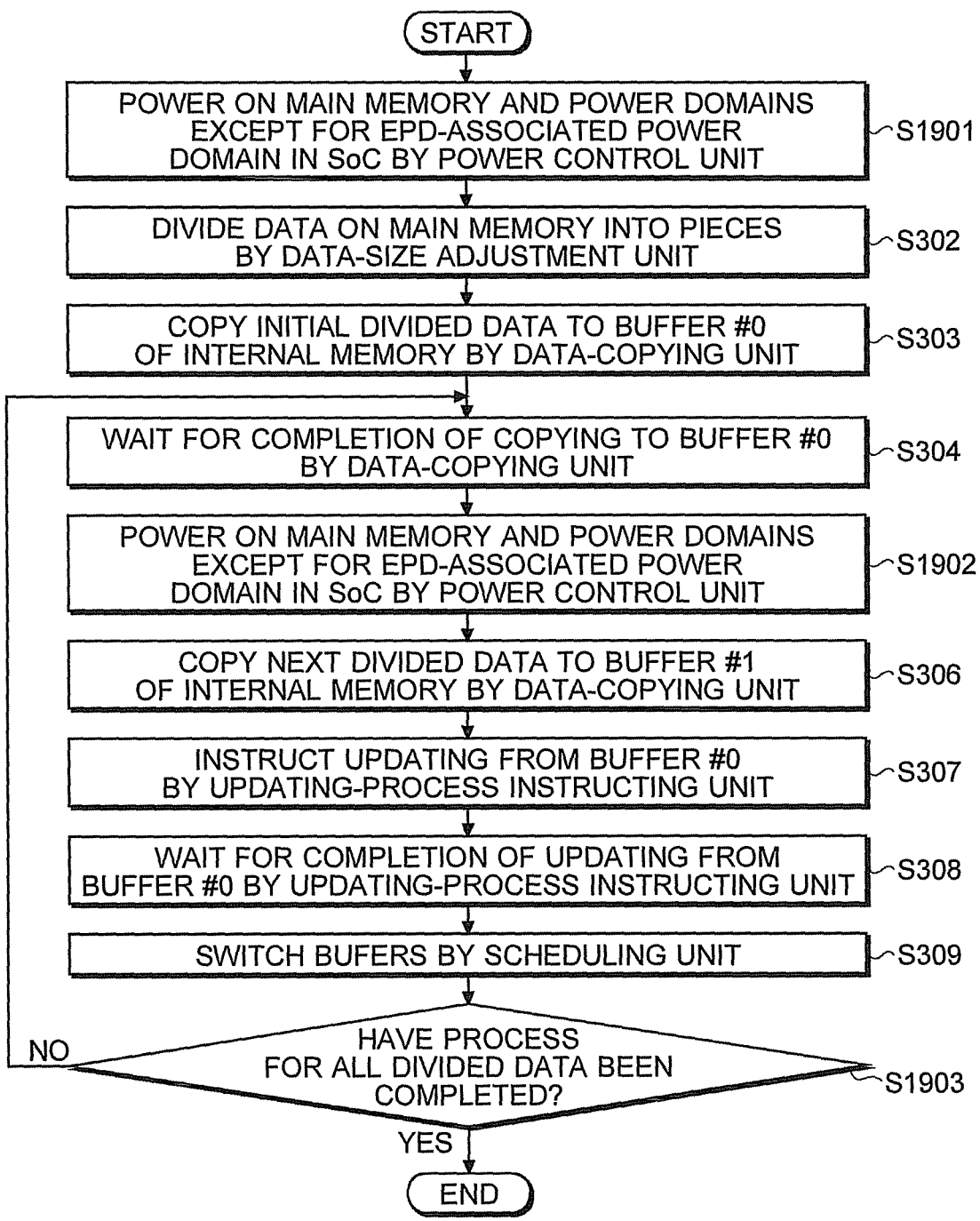
FIG. 30 is an illustration showing an example of a process flow of an EPD control device according to the eighth embodiment.
Figure 31:
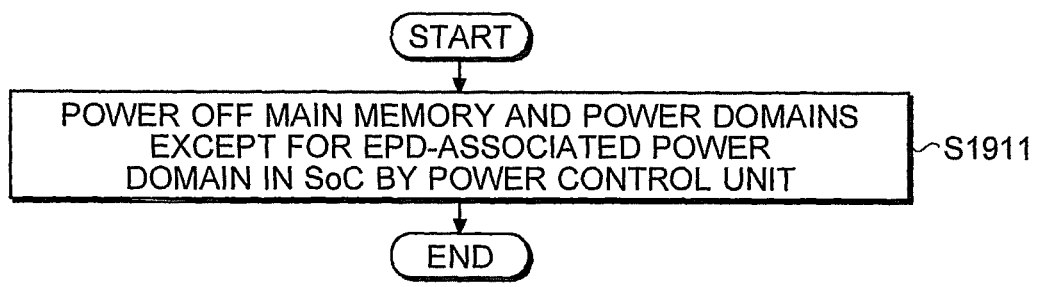
FIG. 31 is an illustration showing an example of another process flow of the EPD control device according to the eighth embodiment.

Next, a specific example of a process flow of the EPD control device (scheduler) 201 for powering off the main memory 102 and the EPD power domains except for the EPD-associated power domain 1811 in the SoC 101 during the updating process of the EPD 103 is shown in FIGS. 30 and 31. In FIG. 30, for the same operations as in the operation shown in FIG. 4, redundant explanations thereof will be omitted by referring to them.

As shown in FIG. 30, when an application, a middleware or an OS requests the scheduling unit 206 of the EPD control device (scheduler) 201 to update the EPD 103 once using the update-data on the main memory 102, for instance, firstly, when the main memory 102 and the EPD power domains except for the EPD-associated power domain 1811 in the SoC 101 are not powered on, in order to prepare for a possible follow-on copying process, the power control unit 202 powers on the main memory 102 and the EPD power domains except for the EPD-associated power domain 1811 in the SoC 101 using the power control device 104 (step S1901). Next, by executing the same operations as steps S302 to S304 in FIG. 4, the initial divided data is copied to the buffer #0.

After completing the process of copying to the buffer #0, next, when the operation mode of the main memory 102 and the EPD power domains except for the EPD-associated power domain 1811 in the SoC 101 are not powered on, the power control unit 202 powers on the main memory 102 and the EPD power domains except for the EPD-associated power domain 1811 in the SoC 101 using the power control device 104 (step S1902). Next, by executing the same operation as steps S306 to S309 in FIG. 4, after completing the updating process with the next divided data, the scheduling unit 206 switches the buffers.

After that, the scheduling unit 206 confirms whether the updating processes for all the divided data are completed or not (step S1903), and when the processes are confirmed as being completed (step S1903; YES), the scheduling unit 206 finishes the operation. On the other hand, when the processes are confirmed as not being completed (step S1903; NO), the scheduling unit 206 returns to step S304 and executes the processes for the next divided data.

As shown in FIG. 31, when the process of copying to the buffer finishes in the middle of the updating process of the EPD 103, the completion of the copying process is notified to the power control unit 202. In response to this, the power control unit 202 powers off the main memory 102 and the EPD power domains except for the EPD-associated power domain 1811 in the SoC 101 using the power control device 104 independently from the operation shown in FIG. 30 (step S1911). Thereby, it is possible to reduce the power consumption of the main memory 102 and the EPD power domains except for the EPD-associated power domain 1811 in the SoC 101 during the updating process.

When a volatile memory such as a DRAM is used as the main memory 102, instead of powering off the main memory 102, it is possible to use the power-saving mode such as a self-refresh mode capable of suppressing power consumption while maintaining data. Furthermore, in the eighth embodiment, although the case of using two buffers is explained as an example, the structure is not limited to such example while it is also possible to employ the same processes in a case of using a single buffer.

In FIGS. 29 to 31, although the case where the whole screen of the EPD 103 is updated is explained as an example, it is also possible to employ the same processes in a case of updating a part of the screen of the EPD 103. Furthermore, in the eighth embodiment, it is naturally also possible to execute the updating processes in parallel as described in the above embodiments. Moreover, in a case where parts of the screen of the EPD 103 are to be partially updated, as in the case of the seventh embodiment, it is possible to employ the same process by creating a plurality of data sets with an appropriate size by grouping a plurality of the update-data.

In the eighth embodiment, as with the above-described fourth and fifth embodiments, it is possible to have the pre-process with respect to the data set created by grouping the next or current update-data overlapped with the copying process. Furthermore, in the eighth embodiment, although the structure in that the EPD controller 108 is integrated into the SoC 101 is explained as an example, the structure is not limited to such example while it is also possible to employ a structure in that the EPD controller 108 is arranged in the exterior of the SoC 101.

Ninth Embodiment

Next, a control device, a data processing device, a controller, a method of controlling thereof, and a computer-readable medium according to a ninth embodiment will be described in detail with the accompanying drawings.

In the ninth embodiment, a case where the EPD controller 108 in the data processing device 100 according to the first embodiment is arranged in the exterior of the SoC 101 will be explained as an example.

Figure 32:
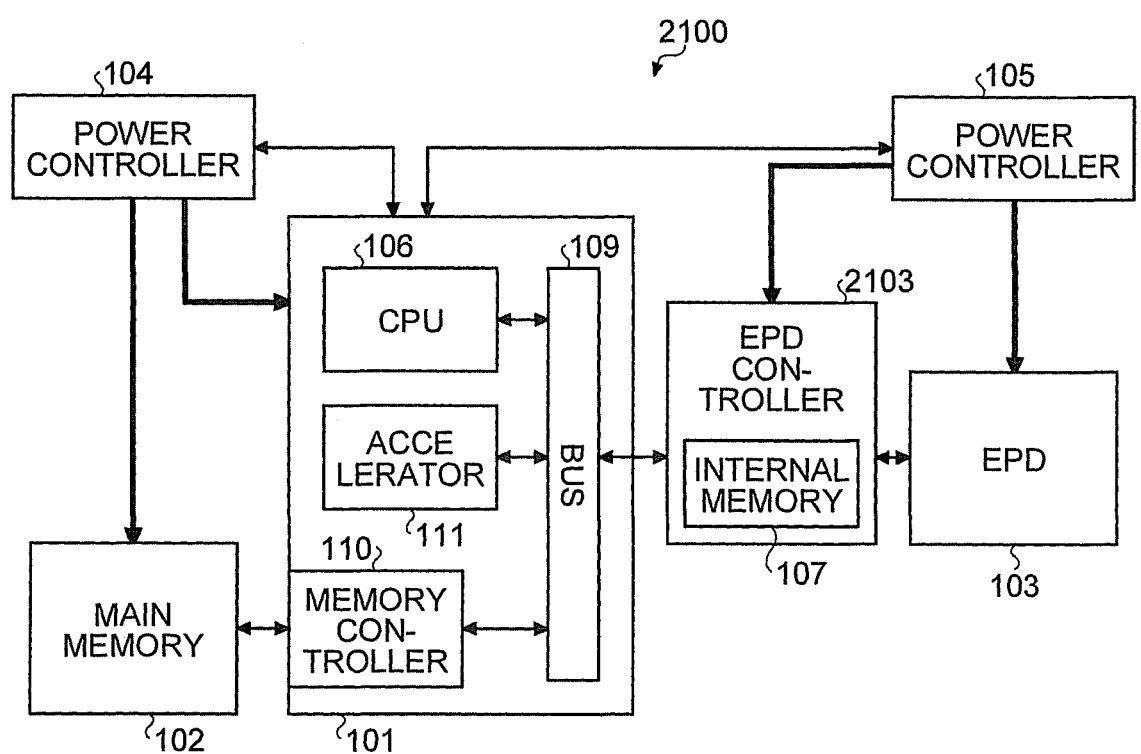
FIG. 32 is a schematic block diagram showing a data processing device according to a ninth embodiment.

FIG. 32 is a block diagram showing an example of an outline structure of a data processing device 2100 according to the ninth embodiment. In FIG. 32, for the same configuration as that of FIG. 1, redundant explanations will be omitted by referring to them using the same reference numbers. Furthermore, a base configuration of an EPD control device (scheduler) according to the ninth embodiment is the same as the configuration of the EPD control device 201 shown in FIG. 2, and therefore, redundant explanations thereof will be omitted by referring to them.

As shown in FIG. 32, the data processing device 2100 according to the ninth embodiment has the same structure as the data processing device 100 shown in FIG. 1 except for the EPD controller 108 in FIG. 1 is replaced with an EPD controller 2103 arranged in the exterior of the SoC 101. Furthermore, the internal memory 107 in the ninth embodiment is arranged in the EPD controller 2103. The internal memory 107 can be a dedicated external memory for the EPD controller 2103.

The power control device 105 feeds power to the EPD controller 2103 in addition to the EPD 103. The power control device 104 feeds power to the main memory 102 and the SoC 101.

By such structure, because it is possible to feed power to the EPD controller 2103 from the power control device 105 during the process of updating the EPD 103, it is possible to power off the whole SoC 101 in addition to the main memory 102. Here, a relation between the power control device 105 and each unit is not limited to the structure shown in FIG. 32.

Figure 33:
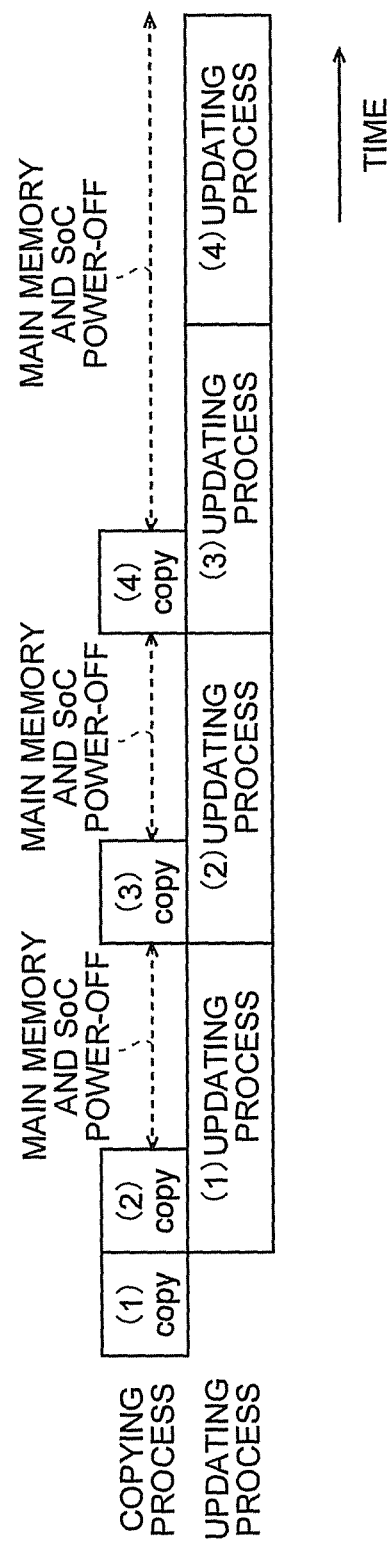
FIG. 33 is an illustration showing an example of operation timing according to the ninth embodiment.

FIG. 33 is a timing chart showing an example of operation timing scheduled by an EPD control device (scheduler) 201 according to the ninth embodiment. In FIG. 33, base operation timing can be the same as the operation timing shown in FIG. 3. However, between FIG. 33 and FIG. 3, what is different is that with the case of FIG. 33 the SoC 101 is powered off in addition to the main memory 102 being powered off during the idle time between the copying processes.

Figure 34:
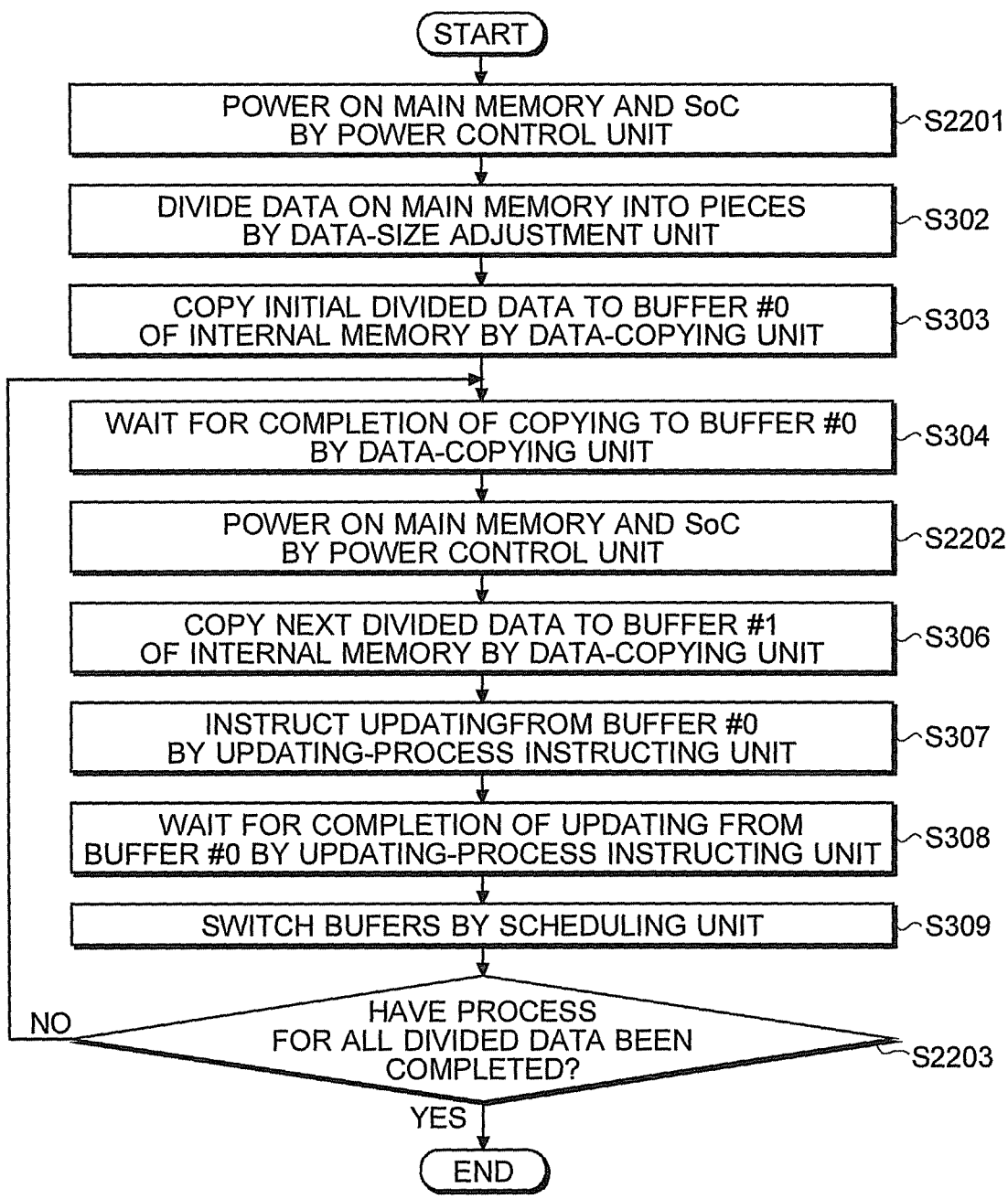
FIG. 34 is an illustration showing an example of a process flow of an EPD control device according to the ninth embodiment.
Figure 35:
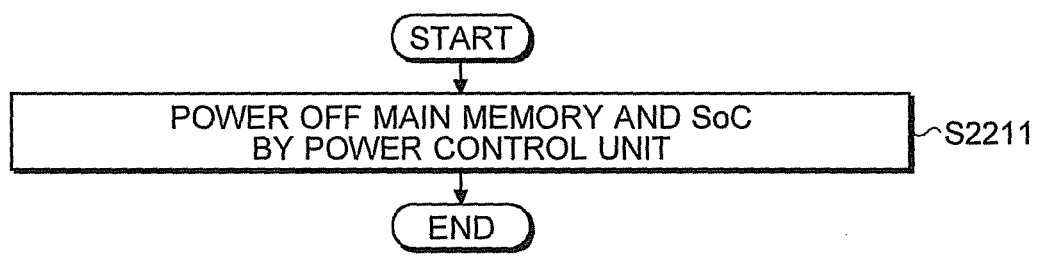
FIG. 35 is an illustration showing an example of another process flow of the EPD control device according to the ninth embodiment.

Next, a specific example of a process flow of the EPD control device (scheduler) 201 for powering off the main memory 102 and the SoC 101 during the updating process of the EPD 103 is shown in FIGS. 34 and 35. In FIG. 34, for the same operations as in the operation shown in FIG. 4, redundant explanations thereof will be omitted by referring to them.

As shown in FIG. 34, when an application, a middleware or an OS requests the scheduling unit 206 of the EPD control device (scheduler) 201 to update the EPD 103 once using the update-data on the main memory 102, for instance, firstly, when the main memory 102 and the SoC 101 are not powered on, in order to prepare for a possible follow-on copying process, the power control unit 202 powers on the main memory 102 and the SoC 101 using the power control device 104 (step S2201). Next, by executing the same operations as steps S302 to S304 in FIG. 4, the initial divided data is copied to the buffer #0.

After completing the process of copying to the buffer #0, next, when the main memory 102 and the SoC 101 are not powered on, the power control unit 202 powers on the main memory 102 and the SoC 101 using the power control device 104 (step S2202). Next, by executing the same operation as steps S306 to S309 in FIG. 4, after completing the updating process with the next divided data, the scheduling unit 206 switches the buffers.

After that, the scheduling unit 206 confirms whether the updating processes for all the divided data are completed or not (step S2203), and when the processes are confirmed as being completed (step S2203; YES), the scheduling unit 206 finishes the operation. On the other hand, when the processes are confirmed as not being completed (step S2203; NO), the scheduling unit 206 returns to step S304 and executes the processes for the next divided data.

As shown in FIG. 35, when the process of copying to the buffer finishes in the middle of the updating process of the EPD 103, the completion of the copying process is notified to the power control unit 202. In response to this, the power control unit 202 powers off the main memory 102 and the SoC 101 using the power control device 104 independently from the operation shown in FIG. 34 (step S2211). Thereby, it is possible to reduce the power consumption of the main memory 102 and the SoC 101 during the updating process.

When a volatile memory such as a DRAM is used as the main memory 102, instead of powering off the main memory 102, it is possible to use the power-saving mode such as a self-refresh mode capable of suppressing power consumption while maintaining data. Furthermore, in the ninth embodiment, although the case of using two buffers is explained as an example, the structure is not limited to such example while it is also possible to employ the same processes in a case of using a single buffer.

In FIGS. 33 to 35, although the case where the whole screen of the EPD 103 is updated is explained as an example, it is also possible to employ the same processes in a case of updating a part of the screen of the EPD 103. Moreover, in a case where parts of the screen of the EPD 103 are to be partially updated, as in the case of the seventh embodiment, it is possible to employ the same process by creating a plurality of data sets with an appropriate size by grouping a plurality of the update-data.

In the ninth embodiment, as with the above-described fourth and fifth embodiments, it is possible to have the pre-process with respect to the data set created by grouping the next or current update-data overlapped with the copying process.

Tenth Embodiment

Next, a control device, a data processing device, a controller, a method of controlling thereof, and a computer-readable medium according to a tenth embodiment will be described in detail with the accompanying drawings.

In the tenth embodiment, a case where an EPD dedicated memory is added to the same structure as the data processing device 2100 according to the ninth embodiment is explained as an example. In such case, the update-data stored on the main memory 102 in the above-described embodiments may be used for the updating process after being stored in the EPD dedicated memory once, or may be directly stored in the EPD dedicated memory.

Figure 36:
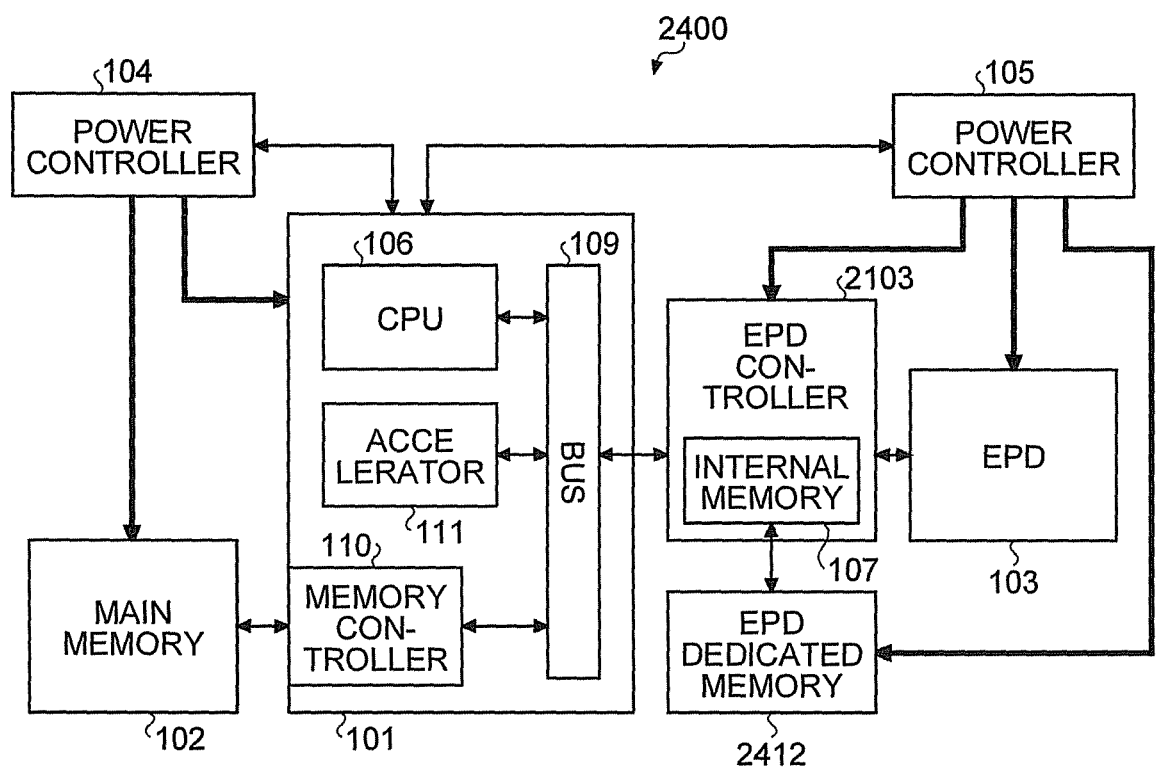
FIG. 36 is a schematic block diagram showing a data processing device according to a tenth embodiment.

FIG. 36 is a block diagram showing an example of an outline structure of a data processing device 2400 according to the tenth embodiment. In FIG. 36, as the same configuration as the FIG. 32, redundant explanations thereof will be omitted by numbering the same reference numbers to them. Furthermore, a base configuration of an EPD control device (scheduler) according to the tenth embodiment is the same as the configuration of the EPD control device 201 shown in FIG. 2, and therefore, redundant explanations thereof will be omitted by referring to them. However, in the tenth embodiment, the EPD control device (scheduler) 201 is a process executed on the EPD controller 2103.

As shown in FIG. 36, the data processing device 2400 according to the tenth embodiment has the same structure as the data processing device 2100 shown in FIG. 32 except that an EPD dedicated memory 2412 is added as the exterior of the EPD controller 2103. To the EPD dedicated memory 2412, before executing the updating process of the EPD 103, the update-data stored in the main memory 102 is transferred.

The EPD dedicated memory 2412 is a non-volatile memory such as a MRAM. However, the EPD dedicated memory 2412 is not limited to such memory while it can be a volatile memory such as a DRAM.

The power control device 105 feeds power to the EPD dedicated memory 2412 in addition to the EPD controller 2103. The power control device 104 feeds power to the main memory 102 and the SoC 101. However, power feeding to the EPD controller 2103 and the EPD dedicated memory 2412 can be done by the power control device 104.

By such structure, because it is possible to feed power to the EPD controller 2103 from the power control device 105 during the process of updating the EPD 103, it is possible to power off the whole SoC 101 in addition to the main memory 102. Furthermore, in a case where a non-volatile memory such as a MRAM is used for the EPD dedicated memory 2412, it is also possible to power off the EPD dedicated memory 2412.

Figure 37:
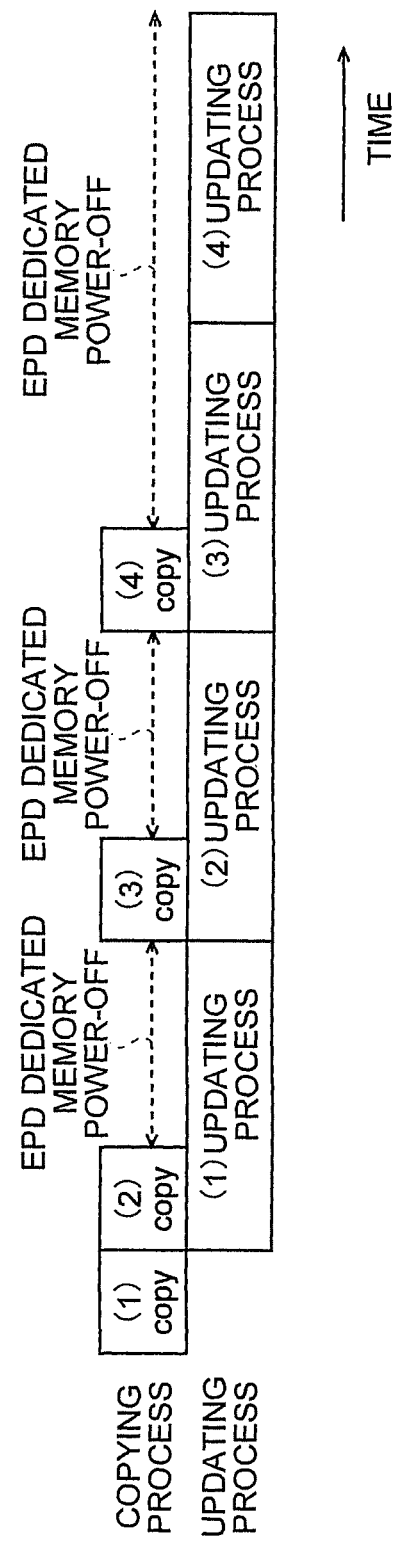
FIG. 37 is an illustration showing an example of operation timing according to the tenth embodiment.

FIG. 37 is a timing chart showing an example of operation timing scheduled by an EPD control device (scheduler) 201 according to the tenth embodiment. In FIG. 37, base operation timing can be the same as the operation timing shown in FIG. 3. However, between FIG. 37 and FIG. 3, what is different is that with the case of FIG. 37 the EPD dedicated memory 2412 is powered off during the idle time between the copying processes. In addition to powering off the EPD dedicated memory 2412, it is also possible to power off the main memory 102 and the SoC 101.

Figure 38:
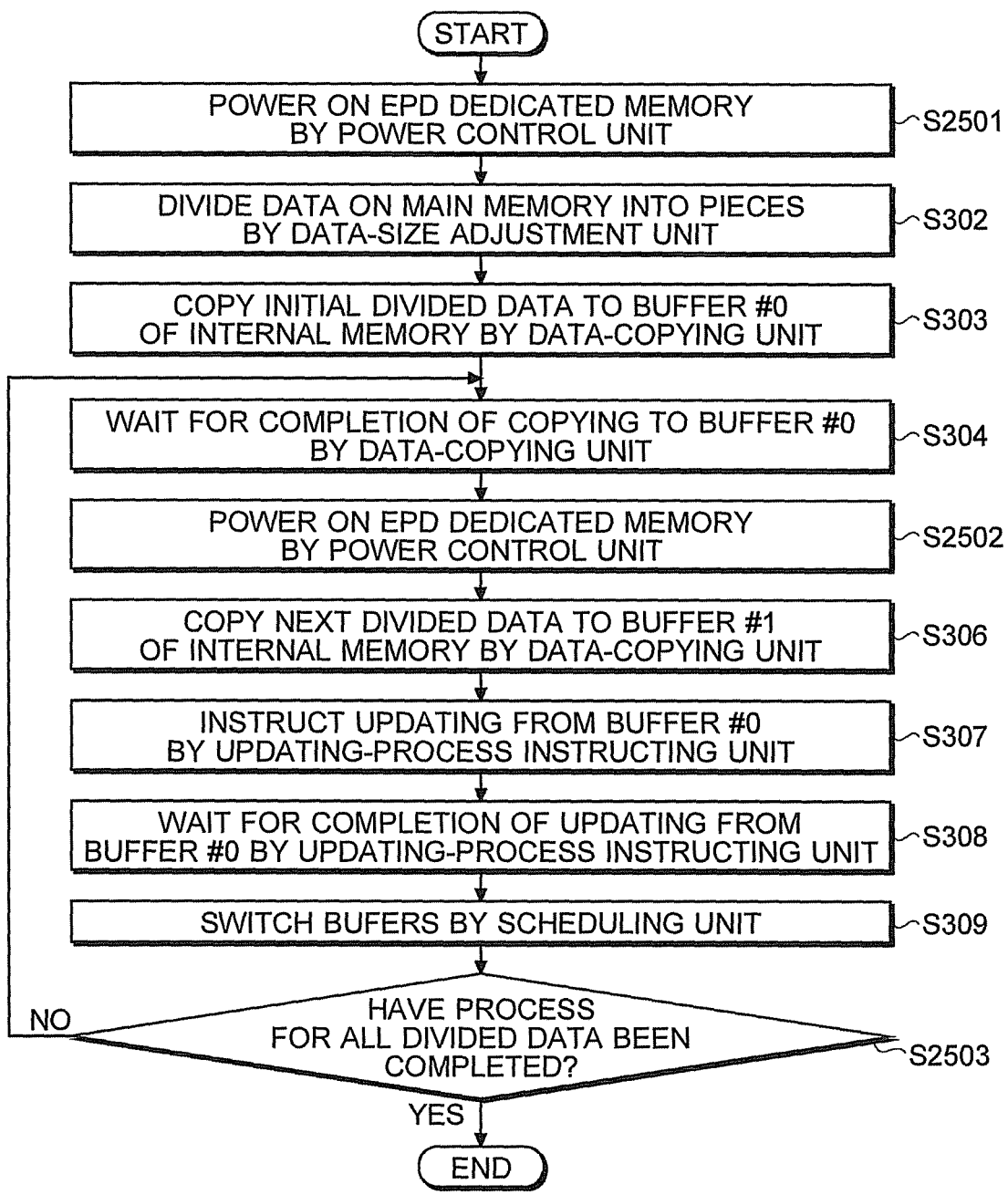
FIG. 38 is an illustration showing an example of a process flow of an EPD control device according to the tenth embodiment.
Figure 39:
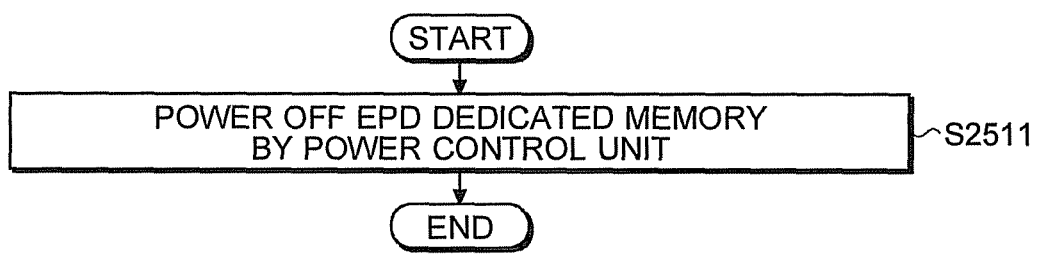
FIG. 39 is an illustration showing an example of another process flow of the EPD control device according to the tenth embodiment.

Next, a specific example of a process flow of the EPD control device (scheduler) 201 for powering off the EPD dedicated memory 2412 during the updating process of the EPD 103 is shown in FIGS. 38 and 39. In FIG. 38, for the same operations as in the operation shown in FIG. 4, redundant explanations thereof will be omitted by referring to them.

The operation shown in FIG. 38 starts after an application, a middleware or an OS requests the scheduling unit 206 of the EPD control device (scheduler) 201 to update the EPD 103 once using the update-data on the main memory 102 and the update-data is transferred from the main memory 102 to the EPD dedicated memory 2412. Here, when the EPD dedicated memory 2412 is a non-volatile memory such as a MRAM, it is possible to preliminarily transfer the update-data to the EPD dedicated memory 2412 and power off the EPD dedicated memory 2412.

In the operation shown in FIG. 38, firstly, when the EPD dedicated memory 2412 is not powered on, the power control unit 202 powers on the EPD dedicated memory 2412 using the power control device 105 (step S2501). Next, by executing the same operations as steps S302 to S304 in FIG. 4, the initial divided data is copied to the buffer #0. Here, a storage destination of the divided data is the EPD dedicated memory 2412 but not the main memory 102. This is the same as in the follow-on operation.

After completing the process of copying to the buffer #0, next, when the EPD dedicated memory 2412 is not powered on, the power control unit 202 powers on the EPD dedicated memory 2412 using the power control device 105 (step S2502). Next, by executing the same operation as steps S306 to S309 in FIG. 4, after completing the updating process with the next divided data, the scheduling unit 206 switches the buffers.

After that, the scheduling unit 206 confirms whether the updating processes for all the divided data are completed or not (step S2503), and when the processes are confirmed as being completed (step S2503; YES), the scheduling unit 206 finishes the operation. On the other hand, when the processes are confirmed as not being completed (step S2503; NO), the scheduling unit 206 returns to step S304 and executes the processes for the next divided data.

As shown in FIG. 39, when the process of copying to the buffer finishes in the middle of the updating process of the EPD 103, the completion of the copying process is notified to the power control unit 202. In response to this, the power control unit 202 powers off the EPD dedicated memory 2412 using the power control device 105 independently from the operation shown in FIG. 38 (step S2511). Thereby, it is possible to reduce the power consumption of the EPD dedicated memory 2412 during the updating process.

When volatile memories such as a DRAM are used as the main memory 102 and the EPD dedicated memory 2412, instead of powering off the main memory 102 and the EPD dedicated memory 2412, it is possible to use the power-saving mode such as a self-refresh mode capable of suppressing power consumption while maintaining data. Furthermore, in the tenth embodiment, although the case of using two buffers is explained as an example, the structure is not limited to such example while it is also possible to employ the same processes in a case of using a single buffer.

In FIGS. 37 to 39, although the case where the whole screen of the EPD 103 is updated is explained as an example, it is also possible to employ the same processes in a case of updating a part of the screen of the EPD 103. Moreover, in a case where parts of the screen of the EPD 103 are to be partially updated, as in the case of the seventh embodiment, it is possible to employ the same process by creating a plurality of data sets with an appropriate size by grouping a plurality of the update-data.

In the tenth embodiment, as with the above-described fourth and fifth embodiments, it is possible to have the pre-process with respect to the data set created by grouping the next or current update-data overlapped with the copying process.

Eleventh Embodiment

Next, a control device, a data processing device, a controller, a method of controlling thereof, and a computer-readable medium according to an eleventh embodiment will be described in detail with the accompanying drawings.

In the above-described embodiments, the cases where the data processing device is the display such as an electronic paper are explained as examples. However, the embodiments are not limited to such cases. For example, the data processing device described above can be a network device for communicating via a network such as a LAN (local area network), the internet, or the like. In such case, the process of updating the EPD 103 can be replaced with at least one of processes of transmitting and receiving to/from the network.

Figure 40:
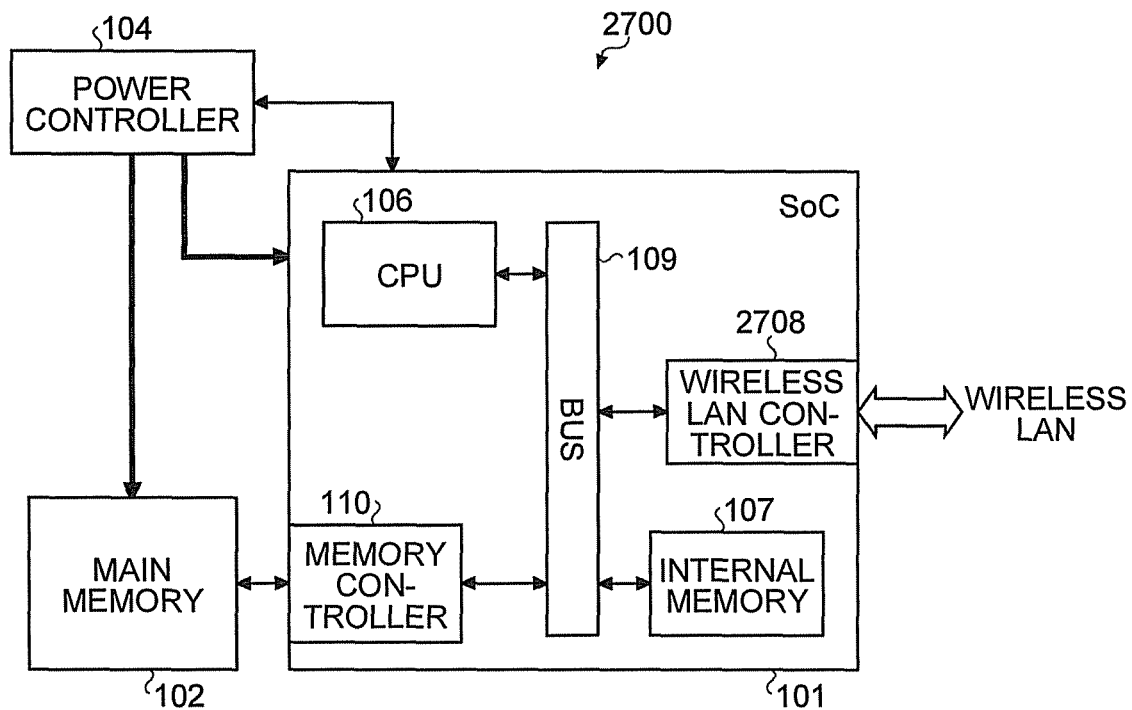
FIG. 40 is a schematic block diagram showing a data processing device according to an eleventh embodiment.

FIG. 40 is a block diagram showing an example of an outline structure of a data processing device 2700 according to the eleventh embodiment. In the eleventh embodiment, a case where a wireless LAN device is used as the data processing device is explained as an example. However, it is also possible to use a wired LAN device as the data processing device instead of the wireless LAN device. In FIG. 40, as the same configuration as the FIG. 1, redundant explanations thereof will be omitted by numbering the same reference numbers to them.

As shown in FIG. 40, the data processing device 2700 according to the eleventh embodiment has the same structure as the data processing device 100 shown in FIG. 1 except for the EPD controller 108 in the SoC 101 is replaced with a wireless LAN controller 2708 and the accelerator 111 is omitted. An access point of the wireless LAN controller 2708 is a wireless LAN instead of the EPD 103. However, the data processing device 2700 can have a display such as the EPD 103. Furthermore, in the data processing device 2700, the power control device 105 is omitted. Power feeding to the main memory 102 and the SoC 101 is conducted by the power control device 104.

Figure 41:
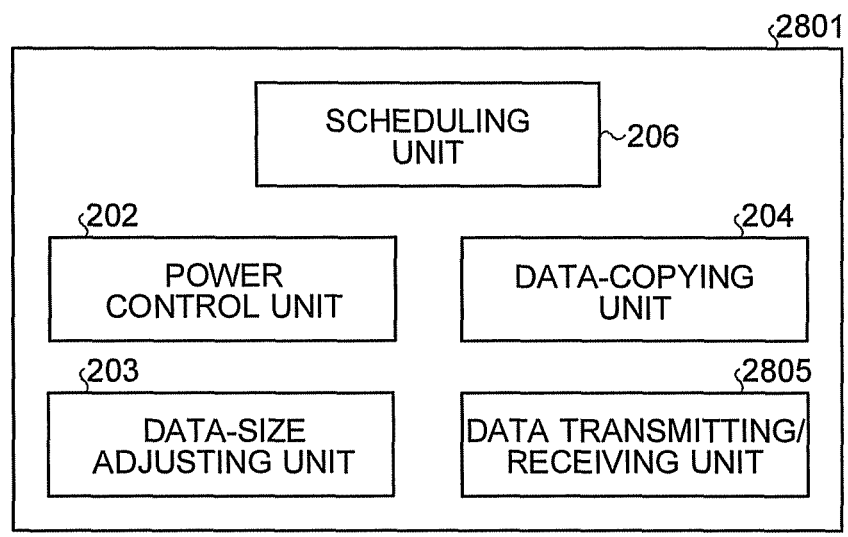
FIG. 41 is a schematic block diagram showing a wireless LAN control device according to the eleventh embodiment.

FIG. 41 is a block diagram showing an outline structure of a wireless LAN control device (scheduler) 2801 according to the eleventh embodiment. The wireless LAN control device (scheduler) 2801 can be a device driver of an OS operating on the CPU 106. In FIG. 41, as the same configuration as the FIG. 2, redundant explanations thereof will be omitted by numbering the same reference numbers to them.

As shown in FIG. 41, as the EPD control device (scheduler) 201, the wireless LAN control device 2801 has the scheduling unit 206, the power control unit 202, the data-size adjusting unit 203 and the data-copying unit 204. Furthermore, the wireless LAN control device (scheduler) 2801 has a data transmitting/receiving unit 2805 instead of the updating-process instructing unit 205.

When the scheduling unit 206 is instructed to transmit data, for instance, from an application, a middleware, an OS, or the like, operating on the data processing device 2700, the scheduling unit 206 makes the power control unit 202, the data-size adjusting unit 203, the data-copying unit 204 and the data transmitting/receiving unit 2805 operate in cooperation with one another. According to such operation, the scheduling unit 206 schedules so that data for transmitting (hereinafter to be referred to as transmit-data) on the main memory 102 is divided in pieces, the divided transmit-data are sequentially copied to two buffers #0 and #1 on the internal memory 107 alternately, and the wireless LAN controller 2708 executes a process of transmitting from the buffer #0 or #1. While the transmission process, the power for the internal memory 107 having the buffers #0 and #1 should be powered on. Access penalty such as power consumption, access time, etc., required for transmitting data can be kept small compared to that of the main memory 102. On the other hand, during this period, it is possible to power off the main memory 102 being a non-volatile memory. Thereby, it is possible to reduce the total power consumption.

The operation for the transmission process can also be applied to a receiving process by reversing the process flow. That is, the receiving processes are executed using the two buffers in the internal memory 107, and after receiving the data to the buffers, the received data are sequentially copied to the main memory 102. Therefore, except for the time the copying process is being executed, it is possible to power off the main memory 102 even if the receiving process is being executed. Therefore, it is possible to reduce the total power consumption.

In the eleventh embodiment, although the internal memory 107 is located in the SoC 101, it is not limited to such structure while it is also possible to locate the internal memory 107 in the wireless LAN controller 2708. Furthermore, in the eleventh embodiment, although the wireless LAN controller 2708 is located in the SoC 101, it is not limited to such structure while it is also possible to use an external wireless LAN controller.

When a volatile memory such as a DRAM is used as the main memory 102, instead of powering off the main memory 102, it is possible to use the power-saving mode such as a self-refresh mode capable of suppressing power consumption while maintaining data.

Twelfth Embodiment

Next, a control device, a data processing device, a controller, a method of controlling thereof, and a computer-readable medium according to a twelfth embodiment will be described in detail with the accompanying drawings.

The data processing device described above can be a graphics accelerator such as a GPU (graphics processing unit).

Figure 42:
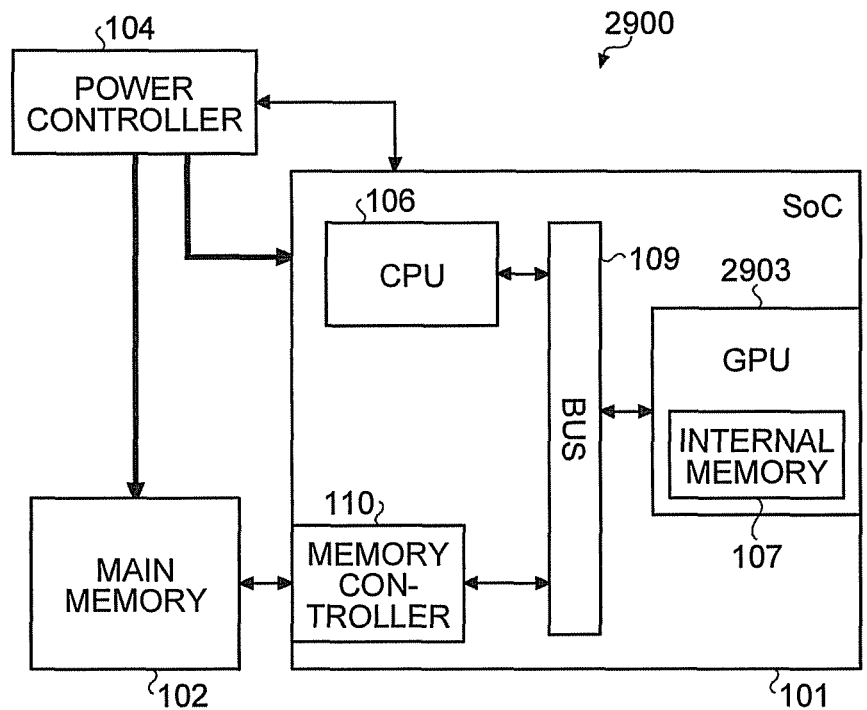
FIG. 42 is a schematic block diagram showing a data processing device according to a twelfth embodiment.

FIG. 42 is a block diagram showing an example of an outline structure of a data processing device 2900 according to the twelfth embodiment. In the twelfth embodiment, a case where an accelerator for off-loading a heavy arithmetic processing to be processed on a GPU, or the like, used as image processing, a GPGPU (general purpose GPU), or the like, is used as the data processing device 2900 is explained as an example. However, the embodiments are not limited such case while it is also possible to use a portable data processing terminal with a display such as the EPD, a PE (processing element) for a super computer which does not have a display and facing an issue of reduction in power consumption, or the like, as the data processing device 2900.

As shown in FIG. 42, the data processing device 2900 according to the twelfth embodiment has the same structure as the data processing device 100 shown in FIG. 1 except for the EPD controller 108 in the SoC 101 is replaced with a GPU 2903 and the accelerator 111 is omitted. Furthermore, in the data processing device 2900, the power control device 105 is omitted and the internal memory 107 is located in the GPU 2903. Power feeding to the main memory 102 and the SoC 101 is conducted by the power control device 104. Although the accelerator 111 is omitted in FIG. 42, it is also possible to have the accelerator 111.

Figure 43:
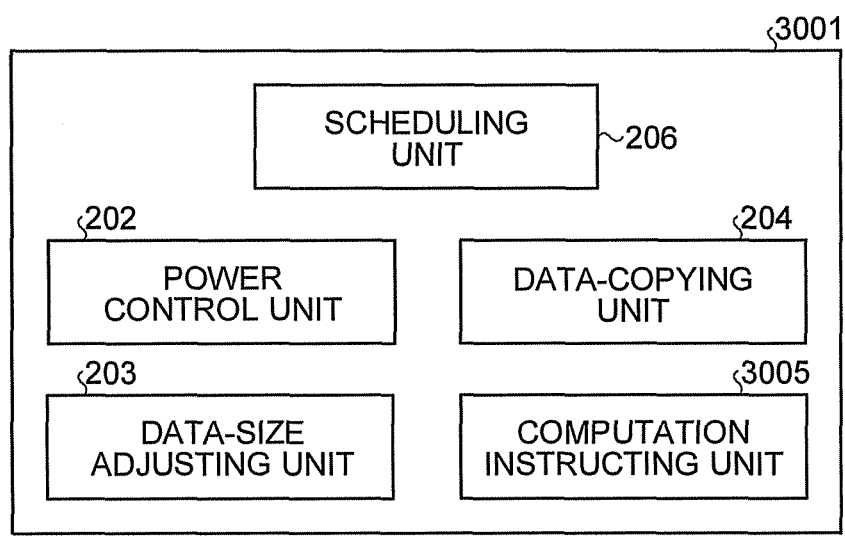
FIG. 43 is a schematic block diagram showing a GPU control device according to the twelfth embodiment.

FIG. 43 is a block diagram showing an outline structure of a GPU control device (scheduler) 3001 according to the twelfth embodiment. The GPU control device (scheduler) 3001 can be a device driver or an application program of an OS operating on the CPU 106, or an application program operating on the GPU 2903. In FIG. 43, as the same configuration as the FIG. 2, redundant explanations thereof will be omitted by numbering the same reference numbers to them.

As shown in FIG. 43, as the EPD control device (scheduler) 201, the GPU control device 3001 has the scheduling unit 206, the power control unit 202, the data-size adjusting unit 203 and the data-copying unit 204. Furthermore, the GPU control device (scheduler) 3001 has a computation instructing unit 3005 instead of the updating-process instructing unit 205.

When the scheduling unit 206 is instructed to off-load an arithmetic processing on the data processing device 2900, for instance, from an application, a middleware, an OS, or the like, operating on the data processing device 2900, the scheduling unit 206 makes the power control unit 202, the data-size adjusting unit 203, the data-copying unit 204 and the computation instructing unit 3005 operate in cooperation with one another. According to such operation, the scheduling unit 206 schedules so that input data for calculating on the main memory 102 is divided in pieces, the divided input data are sequentially copied to two buffers #0 and #1 on the internal memory 107 alternately, and the GPU 2903 executes an arithmetic processing of the input data from the buffer #0 or #1. Therefore, except for the time the copying process is being executed, it is possible to power off the main memory 102 being a non-volatile memory even if the arithmetic processing is being executed. Thereby, it is possible to reduce the power consumption.

Among the applications for GPGPU, there is an application in that in order to promote overhead reduction of data passed between the main memory and the internal memory, data transmission between the main memory and the internal memory is extremely reduced, and there is an application in that in order to promote high-speed processing, data transmission is executed once at the beginning and the end, respectively while calculation is executed only on the internal memory. In such applications, a period of memory access is short. Therefore, a merit of powering off the main memory 102 except for the time the memory is being accessed is extensive. Furthermore, in high-performance computing and cloud computing, because a data amount to be processed is large, it is a great advantage that the unprocessed divided data will not be erased when the main memory 102 is powered off. The operation in the arithmetic processing can also be applied to a process for returning a calculation result to the main memory 102.

In the twelfth embodiment, although the internal memory 107 is located in the GPU 2903, it is not limited to such structure while it is also possible to locate the internal memory 107 in the SoC 101 but outside the GPU 2903. Furthermore, in the twelfth embodiment, although the GPU 2903 is located in the SoC 101, it is not limited to such structure while it is also possible to use an external GPU.

When a volatile memory such as a DRAM is used as the main memory 102, instead of powering off the main memory 102, it is possible to use the power-saving mode such as a self-refresh mode capable of suppressing power consumption while maintaining data.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A control device comprising:
   a data-receiving unit that receives data from a network;
   a data-receiving instructing unit that instructs the data-receiving unit to receive the data from the network and store the received data in a first memory;
   a data-copying unit that copies the data stored in the first memory to a second memory, power consumption of the first memory being less than power consumption of the second memory; and
   a power-control unit that switches power for the second memory from a first power to a second power while the data-receiving unit stores the received data in the first memory,
   the first power being power supplied to the second memory at a time when the data is copied from the first memory to the second memory, and
   the second power being lower than the first power.

2. A control device comprising:
a data-copying unit that copies data in a first memory to a second memory of which power consumption is less than power consumption of the first memory, the data being to be processed at a first data processing unit;
a data-processing instructing unit that instructs the first data processing unit to process the data copied to the second memory; and
a power-control unit that switches power for the first memory from a first power to a second power while the first data processing unit is processing the data copied to the second memory,
the first power being power supplied to the first memory at a time when the data is copied from the first memory to the second memory, and
the second power being lower than the first power, wherein
the data-copying unit copies unprocessed data stored in the first memory to the second memory while the first data processing unit is processing the data copied to the second memory,
the power control unit switches power for the first memory from the first power to the second power after completing copying the data from the first memory to the second memory,
the data-processing instructing unit instructs a second data processing unit that conducts process accompanying access to the first memory to execute the process while the first data processing unit is processing the data copied to the second memory, and
the power control unit switches power for the first memory from the first power to the second power after completing copying the data from the first memory to the second memory and the process by the second data processing unit.

3. A data processing device comprising:
a first data processor that copies first data for updating a first partial area of a display from a first memory to a second memory of which power consumption is less than power consumption of the first memory and starts a first updating process in which the first partial area is updated using the first data copied in the second memory;
a second data processor that, when the first data processor is executing the first updating process, copies second data for updating a second partial area of the display from the first memory to the second memory and starts a second updating process in which the second partial area is updated using the second data copied in the second memory; and
a power controller that, when at least one of the first and second updating processes is executed and except when at least one of the first data and the second data is copied in the second memory, switches power for the first memory from a first power to a second power,
the first power being power supplied to the first memory at a time when the first or second data is copied from the first memory to the second memory, and
the second power being lower than the first power.

4. The device according to claim 3, wherein
the first data processor executes, when the first partial area is larger than the second partial area, a third updating process in which the first partial area is updated using the first data stored in the first memory,
the second data processor executes, when the second partial area is larger than the first partial area, a fourth updating process in which the second partial area is updated using the second data stored in the first memory, and
the power controller switches the power for the first memory from the first power to the second power when at least one of the first to fourth updating processes is executed and except when at least one of the first data and the second data is copied in the second memory or except when the third updating process is executed or except when the fourth updating process is executed.

5. The device according to claim 3, wherein
the first memory stores a waveform for updating the display, and
at least one of the first and second data processors copies the waveform from the first memory to the second memory while copying the first or second data from the first memory to the second memory.

6. The device according to claim 3, wherein
the first memory is a non-volatile memory, and
the power controller sets power at a time when power supply to the first memory is shut off to the second power.

7. The device according to claim 3, wherein
the first memory is a volatile memory having a power-saving mode, and
the power control unit sets power under the power-saving mode to the second power.

8. The device according to claim 3, wherein
the first data processing unit is an electronic paper display controller.

9. The device according to claim 3, wherein
the second memory is a memory of which capacity is smaller than that of the first memory.

10. A data processing device comprising:
a first data processor that copies first data for updating a first partial area of a display from a first memory to a second memory of which power consumption is less than power consumption of the first memory and starts a first updating process in which the first partial area is updated using the first data copied in the second memory;
a second data processor that executes a second updating process in which a second partial area of the display is updated using second data stored in the first memory; and
a power controller that, except when at least one of the first and second updating processes is executed, switches power for the first memory from a first power to a second power,
the first power being power supplied to the first memory at a time when the first or second data is read out from the first memory, and
the second power being lower than the first power.

11. The device according to claim 10, wherein
the second data is greater than the first data.

12. A data processing device comprising:
a processor including a data copying unit and a first data processor, the data copying unit copying first data for updating a first partial area of a display from a first memory to a second memory of which power consumption is less than power consumption of the first memory, the first data processor executing a first updating process in which the first partial area is updated using the first data copied in the second memory; and
a power controller that, when the first updating process is executed, switches power for the first memory from a first power to a second power and switches power for the processor from a third power to a fourth power, the first power being power supplied to the first memory at a time when the first data is copied from the first memory to the second memory, the second power being lower than the first power, the third power being power supplied to the processor at a time when the first data is copied from the first memory to the second memory, and the fourth power being lower than the third power.

13. A data processing device comprising:

a data copying unit that copies first data and second data at once from a first memory to a second memory of which power consumption is less than power consumption of the first memory, the first data being data for updating a first partial area of a display, the second data being data for updating a second partial area of the display;

a first data processor that executes a first updating process in which the first partial area is updated using the first data copied in the second memory;

a second data processor that starts, when the first updating process is executed or at the same time when the first updating process is started, a second updating process in which the second partial area is updated using the second data copied in the second memory; and a power controller that, when at least one of the first and second updating processes is executed, switches power for the first memory from a first power to a second power, the first power being power supplied to the first memory at a time when the first and second data is copied from the first memory to the second memory, the second power being lower than the first power.

* * * * *